(12) United States Patent
Schlüter

(10) Patent No.: US 6,505,539 B2
(45) Date of Patent: Jan. 14, 2003

(54) VACUUM BRAKE BOOSTER WITH MECHANICAL EMERGENCY BRAKING ASSISTANCE

(75) Inventor: Peter Schlüter, Kammerforst (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/776,601

(22) Filed: Feb. 2, 2001

(65) Prior Publication Data

US 2001/0003947 A1 Jun. 21, 2001

Related U.S. Application Data

(63) Continuation of application No. PCT/EP99/04822, filed on Jul. 8, 1999.

(30) Foreign Application Priority Data

Aug. 5, 1998 (DE) ......................................... 198 35 409
Oct. 28, 1998 (DE) ..................................... 298 19 224 U
Mar. 5, 1999 (DE) ..................................... 299 04 055 U

(51) Int. Cl.[7] ................................................ F15B 9/10
(52) U.S. Cl. ........................................ 91/367; 91/369.2
(58) Field of Search .......................... 91/369.2, 369.3, 91/367, 376 R

(56) References Cited

U.S. PATENT DOCUMENTS 5,493,946 A    2/1996  Schluter
5,779,329 A  * 7/1998  Takeshima .................. 303/155
6,161,463 A  * 12/2000 Suwa ........................... 91/367

FOREIGN PATENT DOCUMENTS

DE    4405092       12/1994
JP    09175373      7/1997
JP    9-175373    * 7/1997 ............... 91/376 R

* cited by examiner

Primary Examiner—F. Daniel Lopez
(74) Attorney, Agent, or Firm—MacMillan, Sobanski & Todd, LLC

(57) ABSTRACT

A vacuum brake booster (10) has a vacuum chamber (18) and a working chamber (20) separated from one another in a pressure-proof manner by a movable wall (16). A control valve (22), which comprises a housing (24) workingly coupled to the movable wall (16), has a first valve seat (50), which is disposed in the housing (24) and to achieve a pressure difference at the movable wall (16) is capable of controlling the supply of at least atmospheric pressure to the working chamber (20) in dependence upon the displacement of an input element (26) coupled to the first valve seat (50). For improved boosting of the brake force during emergency braking operations, an armature (38), which cooperates with a permanent magnet (40), is provided in the control valve housing (24) and is rigidly coupled on the one hand to the actuating element (26) in actuating direction and on the other hand to the first valve seat (50). The armature (38) is resiliently preloaded counter to actuating direction and in the starting position of the control valve (22) is held at a first distance from the permanent magnet (40). The armature (38), as it approaches the permanent magnet (40) and is less than a previously defined second distance away, which is smaller than the first distance, is pulled by the permanent magnet (40) counter to the resilient preloading force acting upon the armature (38) and with simultaneous cancellation of its, in actuating direction, rigid coupling to the actuating element (26) into contact with the permanent magnet (40).

32 Claims, 19 Drawing Sheets

VACUUM BRAKE BOOSTER WITH MECHANICAL EMERGENCY BRAKING ASSISTANCE

CROSS REFERENCE TO RELATED APPLICATIONS

This application is a continuation of International Application No. PCT/EP99/04822 filed Jul. 8, 1999, which claims priority to German Patent Application No. 19835409.6 filed Aug. 5, 1998, German Utility Model Application No. 29819224.1 filed Oct. 28, 1998, and German Utility Model Application No. 29904055.0 filed Mar. 5, 1999.

BACKGROUND OF THE INVENTION

The invention relates to a vacuum brake booster comprising a vacuum chamber and a working chamber separated from one other in a pressure-proof manner by a movable wall, as well as a control valve which comprises a housing workingly coupled to the movable wall and containing a first valve seat, which is disposed in said housing and to achieve a pressure difference at the movable wall is capable of controlling the supply of at least atmospheric pressure to the working chamber in dependence upon the displacement of an input element of the brake booster coupled to the first valve seat. Vacuum brake boosters of said type have been known for some time and millions of them are being used to boost the actuating forces of a vehicle hydraulic brake system and thereby keep them at a level, which is comfortably low for the driver of a vehicle.

Also known are so-called braking assistants. By said term is usually meant a system, which in an emergency braking situation, given substantially the same actuating force, may provide a driver with increased braking power. Systems of said type were developed because research revealed that most vehicle users in an emergency braking situation do not press on the brake pedal as hard as is needed to achieve the maximum braking power. The stopping distance of the vehicle is therefore longer than necessary. Systems of said type, which are already in production, use an electromagnetically actuable brake booster combined with a device which is capable of determining the actuating speed of the brake pedal. When said device detects an actuating speed above a preset threshold value, it is assumed that an emergency braking situation exists and the brake booster is set by the electromagnetic actuating device to full output, i.e. it provides its maximum boosting power.

Brake boosters with an electromagnetic actuating facility are however too expensive for low- to medium-priced motor vehicles.

There is therefore a call for solutions which achieve a braking assistance function with a lower outlay.

SUMMARY OF THE INVENTION

The object of the invention is to provide a vacuum brake booster of the described type with a braking assistance function without having to have recourse to an electromagnetically actuable control valve. At the same time, unintentional tripping of the braking assistance function is to be avoided as far as possible.

According to the invention, therefore, a permanent magnet and an armature cooperating therewith are disposed in the housing of the control valve. The armature is rigidly coupled, on the one hand, to the input element of the brake booster and/or of the control valve and, on the other hand, to the first valve seat. The armature, which is reciprocable relative to the permanent magnet, is preloaded resiliently counter to actuating direction and in the starting position of the control valve is held at a first distance from the permanent magnet, preferably by means of the resilient preloading counter to actuating direction. In the course of an approach to the permanent magnet, which occurs when the brake booster is actuated, the armature may become less than a previously defined second distance away from the permanent magnet, which is smaller than the first distance. When the armature is less than said distance away, the armature is pulled by the permanent magnet counter to the resilient preloading force acting upon the armature and with simultaneous cancellation of its rigid coupling in actuating direction to the input element into contact with the permanent magnet. Thus, even if the actuating force introduced into the brake booster does not increase, the first valve seat coupled to the armature remains fully open so that the brake booster builds up the maximum pressure difference between its vacuum chamber and its working chamber, i.e. the brake booster provides its maximum boosting power.

In preferred embodiments of the vacuum brake booster according to the invention, said second distance is defined by the magnitude of the resilient preloading force acting upon the armature. When the resilient preloading force acting upon the armature is low, this means that the said second distance is relatively great, i.e. the threshold which has to be crossed to trip the braking assistance function is relatively low. The opposite applies when the resilient preloading force acting upon the armature is high. Thus, by suitably selecting the resilient preloading force acting upon the armature and the said first distance it is possible to preselect a tripping threshold, which on the one hand prevents unintentional full brake applications but on the other hand may still be reliably crossed when necessary, even by drivers who possess less strength.

To enable the previously described tripping threshold to be selected according to requirements without excessively varying the forces to be summoned up by the user during a braking operation, according to a preferred embodiment of the vacuum brake booster according to the invention an element, which is movable relative to the armature, is resiliently preloaded relative to the armature in such a way that it projects from the armature in the direction of the permanent magnet and in the starting position of the control valve (neutral position) is not in contact with the permanent magnet. It is only when the element, which is movable relative to the armature, upon actuation of the vacuum brake booster has been applied against the permanent magnet that the resilient preloading force, which defines the said second distance, acts upon the armature. When the armature is of a hollow-cylindrical design, the element movable relative to the armature and projecting from the latter in the direction of the permanent magnet may, for example, take the form of a spacer sleeve disposed concentrically with the armature. Such a spacer sleeve may be situated radially outside of, or alternatively radially inside, the armature. However, the element movable relative to the armature need not be sleeve-shaped and may alternatively be of a different configuration, e.g. pin-shaped.

In preferred embodiments of the vacuum brake booster according to the invention, the permanent magnet is guided displaceably in the control valve housing and is preferably moreover preloaded counter to actuating direction resiliently against a stop. Such an embodiment has the advantage that, when the armature in the course of a rapidly effected actuation of the brake booster has become less than the previously defined second distance away from the permanent magnet and has consequently been pulled into contact with the permanent magnet and the actuating force exerted upon the input element is further increased, said actuating force is not transmitted from the input element via the unit comprising armature and permanent magnet to the control valve housing and from there to a master cylinder disposed downstream of the vacuum brake booster, rather an increased actuating force exerted upon the input element is transmitted directly from the input element to the downstream master cylinder. The magnetic device, in particular the armature, the permanent magnet and the components accommodating said parts, may therefore be of a less stable design. When, for all conceivable actuating situations, the intention is to prevent the magnetic device from changing into a force-transmitting state, then the permanent magnet has to be displaceable in actuating direction relative to the control valve housing by a distance which is greater than the maximum possible actuating stroke of the input element minus the said first distance.

Given the provision of a stop for the permanent magnet, in order to prevent a misalignment of the contact face of the permanent magnet with the contact face of the armature from arising as a result of manufacturing tolerances and possibly leading to canting and subsequent jamming of the armature and/or permanent magnet, in preferred embodiments the stop for the permanent magnet and/or the contact face, which is formed on the permanent magnet (or the latter's mounting) and cooperates with the previously described stop, is crowned. Furthermore, there is a radial play between the permanent magnet or the latter's mounting and the control valve housing. Thus, the permanent magnet may always be correctly aligned with the armature. Alternatively, the armature itself may be fashioned in such a way that its contact face allows a specific swivelling to compensate the said misalignment.

Although the permanent magnet may be resiliently preloaded against the stop in any manner, it is preferred when an, on the whole, annular spring element comprising a plurality of resilient segments of a circle is used to preload the permanent magnet counter to actuating direction. Such a spring element has a very low axial length and therefore reduces the overall length of the control valve equipped with a magnetic device according to the invention.

The stop, against which the permanent magnet resiliently preloaded counter to actuating direction is supported, may be, for example, a step in the control valve housing. Preferably, however, said stop is formed by a stop ring, which is supported in the control valve housing and the axial extension of which defines the said first distance. By virtue of selecting stop rings of differing axial extension it is therefore possible to adjust the said first distance between the armature and the permanent magnet. It is particularly preferred when such a stop ring is made of plastics material in order to deaden the impact noise of the permanent magnet.

In another preferred embodiment of the vacuum brake booster according to the invention, the armature and the permanent magnet are coupled together into a displaceable unit by means of a fettering component, which allows a convergence of the armature with the permanent magnet. In said embodiment the resilient preloading force, which defines the said second distance, acts upon the armature only when the displaceable unit of armature and permanent magnet is resting against a stop, which prevents the displacement of the unit in actuating direction. With such an embodiment the said second distance may be set relatively small without the then necessary, high resilient preloading force acting upon the armature making itself adversely felt in the form of a correspondingly increased response force upon actuation of the brake booster. The displaceable unit of armature and permanent magnet may initially be displaced in actuating direction counter to only a low spring force, during which the position of the armature relative to the permanent magnet does not alter. It is only when the displaceable unit is resting against the said stop that the full spring force acting upon the armature is perceptible to the user of the brake booster. Because such a state, i.e. the resting of the displaceable unit against the stop, occurs only in an emergency braking situation where the driver in any case presses relatively hard and quickly on the brake pedal, the then increased actuating force of the brake booster is in practice not noticed at all by the driver.

The displaceable unit of armature and permanent magnet is preferably guided in the housing of a magnetic device, which housing is fixed in the control valve housing and provides the stop.

Embodiments of the vacuum brake booster according to the invention, which comprise a displaceable unit of armature and permanent magnet, are advantageously designed in such a way that a first spring pushes the armature and the permanent magnet apart from one another and that a second spring preloads the displaceable unit counter to actuating direction. Preferably the joint force of both springs defines the said second distance, below which the force of attraction exerted by the permanent magnet upon the armature exceeds the spring force acting in the opposite direction, with the result that the armature moves into contact with the permanent magnet. In a constructionally advantageous manner, in such embodiments the first spring is clamped axially between the armature and the fettering component and the permanent magnet is fixed relative to the fettering component. The latter may be achieved, for example, by the permanent magnet being accommodated in the fettering component.

In the previously described embodiments with the displaceable unit of armature and permanent magnet, the second spring is preferably supported by its one end against the stop and by its other end against the armature. To save space, the second spring is preferably disposed coaxially with the first spring. When both springs are helical compression springs, the second spring, for example, may be surrounded by the first spring.

According to a preferred refinement of the vacuum brake booster according to the invention with a displaceable unit of armature and permanent magnet, the armature comprises a base and a magnetic plate, which is connected to the latter and faces the permanent magnet. Thus, only the magnetic plate need be made of a material which is attracted by the permanent magnet, while the base of the armature may be made of non-magnetic material, e.g. a plastics material. If the armature is hollow-cylindrical, then the magnetic plate is preferably annular.

In preferred embodiments of the vacuum brake booster according to the invention, the first valve seat of the control valve controlling the ventilation of the working chamber is rigidly coupled in actuating direction via the armature to the input element. The first valve seat may however alternatively be actuated directly by the input element.

In all embodiments of the vacuum brake booster according to the invention, the first valve seat is preferably formed on an, in particular, sleeve-shaped extension rigidly connected to the armature. Thus, each movement of the armature is transmitted without play to the first valve seat.

When the first valve seat is formed on an extension rigidly connected to the armature, a locking bar rigidly connected to the input element preferably extends into a recess of the extension, in which the locking bar in the direction of displacement of the input element has a play which is smaller than the maximum possible actuating stroke of the input element. Thus, the locking bar rigidly coupled to the input element may, during the return movement of the input element, i.e. upon release of the brake, detach the extension rigidly connected to the armature optionally from the permanent magnet, i.e. switch off the braking assistance function. The precise shape of the recess in the extension is in said case unimportant, the only crucial aspect being that, while the return movement is still occurring, the locking bar or some other part rigidly connected to the input element comes into positive engagement with the extension.

In all embodiments of the vacuum brake booster according to the invention, the input element is preferably resiliently preloaded counter to actuating direction. Upon release of the brake, said resilient preloading force returns the input element into the starting position. In a constructionally advantageous manner, said resilient preloading of the input element during its return movement into the starting position is also utilized to detach the armature from the permanent magnet, e.g. by means of the previously described locking bar, which engages into a recess of the extension coupled to the armature.

To reduce or eliminate potentially irritating impact noises which may arise as a result of the return stroke movement of the armature effected after detachment of the armature from the permanent magnet, in all embodiments of the vacuum brake booster according to the invention said return stroke movement is preferably damped by an elastomeric element, which is disposed between the armature and the stop face, towards which the armature moves during its return stroke movement. In a simple and yet effective embodiment, the elastomeric element is an O-ring.

Mostly an emergency braking operation is initiated from the non-operated position of the vacuum brake booster. In other words, the brake system of the vehicle is normally not in operation when an emergency braking situation occurs and the driver will only actuate the brake system in response to the emergency braking situation. However, it is also perfectly possible for situations to arise where, in the course of a braking operation, an emergency braking operation becomes necessary, e.g. when a driver has underestimated how far away an obstacle is. Tripping the braking assistance function in such situations, i.e. when the driver, having already initiated a braking operation, would suddenly like to carry out an emergency braking operation, requires far more work (force x displacement) than tripping the braking assistance function from the non-operated state of the brake system and/or vacuum brake booster. The reason for this is that in the operated state of the brake system the pressures generated in its hydraulic system retroact upon the vacuum brake booster and in particular upon the latter's input element. During a braking operation, therefore, the pressure prevailing in the hydraulic chamber of the master cylinder disposed functionally downstream of the vacuum brake booster first has to be overcome before the input element of the vacuum brake booster may be displaced further in actuating direction. occasionally, in such situations, drivers possessing less strength may find it difficult to trip the braking assistance function.

In order to guarantee reliable tripping of the braking assistance function also when the brake system is already in operation, i.e. during a braking operation, in preferred embodiments of the vacuum brake booster according to the invention, in which the permanent magnet is displaceable either together with the armature or individually in the control valve housing, the said first distance between the armature and the permanent magnet is reduced in dependence upon the counterforce retroacting from the master cylinder upon the vacuum brake booster. As the counterforce increases, therefore, the first distance between the armature and the permanent magnet is reduced so that the additional displacement needed to reach the previously defined second distance—which substantially defines the tripping threshold of the braking assistance function—is likewise reduced. Given a suitable design of the system, it is thereby possible to achieve the effect whereby always the same work is needed to trip the braking assistance function, regardless of whether the brake system is in operation or not.

In preferred embodiments, the counterforce acts upon an adjusting sleeve, which is connected to the permanent magnet or its mounting. Said adjusting sleeve may be rigidly connected to the permanent magnet and may moreover comprise a stop, which cooperates with the control valve housing and limits the reduction of the first distance, preferably to a dimension slightly greater than the second distance. Thus, unintentional tripping of the braking assistance function, such as would occur were the first distance to be reduced to less than the second distance, is avoided.

The adjusting sleeve may however also comprise a stop, against which the permanent magnet (or its mounting) is resiliently preloaded counter to actuating direction. Given such a refinement, the permanent magnet may be displaced in actuating direction relative to the adjusting sleeve. This may be advantageous in the tripped state of the braking assistance function in order to prevent a frictional engagement between the permanent magnet and the adjusting sleeve.

Many of the vacuum brake boosters currently in use have at their power output side a reaction disk made of elastomeric material, which is inserted between the vacuum brake booster and the master cylinder connected thereto. As is known to experts in the present field, such a reaction disk improves the response of a vacuum brake booster from its non-operated position. According to an embodiment of the vacuum brake booster according to the invention, the counterforce retroacting from the master cylinder upon the vacuum brake booster is transmitted by said reaction disk to the adjusting sleeve. The adjusting sleeve in turn is supported counter to actuating direction, i.e. in the direction of the counterforce, via a resiliently compliant element against the control valve housing. The compressing of the resiliently compliant element as the counterforce increases then leads to a displacement of the adjusting sleeve counter to actuating direction and hence to the desired convergence of the permanent magnet with the armature. The resiliently compliant element, via which the adjusting sleeve is supported against the control valve housing, may be e.g. an elastomeric ring but alternatively a helical spring, a resiliently preloading disk, a corrugated disk or the like.

According to another embodiment, in which the previously mentioned reaction disk of elastomeric material is not provided, the counterforce retroacting from the master cylinder upon the vacuum brake booster is transmitted by a reaction sleeve preferably directly to the adjusting sleeve so that the latter in turn, as the counterforce increases, is displaced counter to actuating direction. In said embodiment, the adjusting sleeve is preloaded in actuating direction by means of a separate spring.

In the previously described embodiments of the vacuum brake booster according to the invention, even in the inoperative state of the latter magnetic forces still act upon the armature. The springs provided in the control valve are designed so as to counteract said magnetic forces exerted upon the armature in the neutral position by the permanent magnet in order to prevent a convergence of the armature with the permanent magnet. The spring force of the said springs therefore has to be slightly higher than usual, which entails increased actuating forces because the force of the springs has to be surmounted upon actuation of the vacuum brake booster.

To achieve an improvement in said respect, in preferred embodiments of the vacuum brake booster according to the invention a lever arrangement acting upon the permanent magnet is provided, by means of which the said first distance between the armature and the permanent magnet is reduced, upon actuation of the control valve, without falling below the said second distance between the armature and the permanent magnet. Thus, the first distance, i.e. the distance between the permanent magnet and the armature in their neutral position, may be set relatively great without leading to an increase of the displacement needed to trip the braking assistance function. The greater first distance between the permanent magnet and the armature reduces the magnetic forces acting in the neutral position upon the armature, with the result that the appropriate springs of the control valve may be weaker, thereby reducing the force needed to actuate the control valve. As soon as the control valve is actuated, the lever arrangement ensures that the permanent magnet is moved in the direction of the armature in order to reduce the first distance.

The permanent magnet is preferably preloaded resiliently into contact with the lever arrangement so that each movement of the lever arrangement is transmitted directly to the permanent magnet.

In order, in the operated state of the control valve, to achieve a defined distance between the armature and the permanent magnet which naturally has to be greater than the said second distance, upon actuation of the control valve the lever arrangement presses the permanent magnet preferably against a stop formed e.g. at the inside of the control valve housing.

In a particularly preferred embodiment of the vacuum brake booster according to the invention, the lever arrangement is supported by its one lever end against the input element or a power output tappet connected thereto and by its other lever end against the permanent magnet. The control valve housing in said embodiment forms a fulcrum for the lever arrangement.

In a manner which is constructionally advantageous because it is inexpensive, space-saving and operationally very reliable, the lever arrangement is an, on the whole, annular element formed by a plurality of radially extending arms, which are in each case U-shaped in cross section and are connected to one another radially at the inside. The element is centrally penetrated by the power output tappet and supported against a step of the latter. Each arm of the element roughly in the middle of its extension is in contact with a step, which is formed in the control valve housing and therefore forms a fulcrum, about which each arm tilts upon displacement of the power output tappet.

There now follows a detailed description of several preferred embodiments of a vacuum brake booster according to the invention with reference to the accompanying diagrammatic drawings.

BRIEF DESCRIPTION OF THE DRAWINGS

FIG. 13A is an enlarged view of a portion of the vacuum brake booster of FIG. 13.

FIG. 14A is an enlarged view of a portion of the vacuum brake booster of FIG. 14.

DETAILED DESCRIPTION OF THE INVENTION

Figure 1:
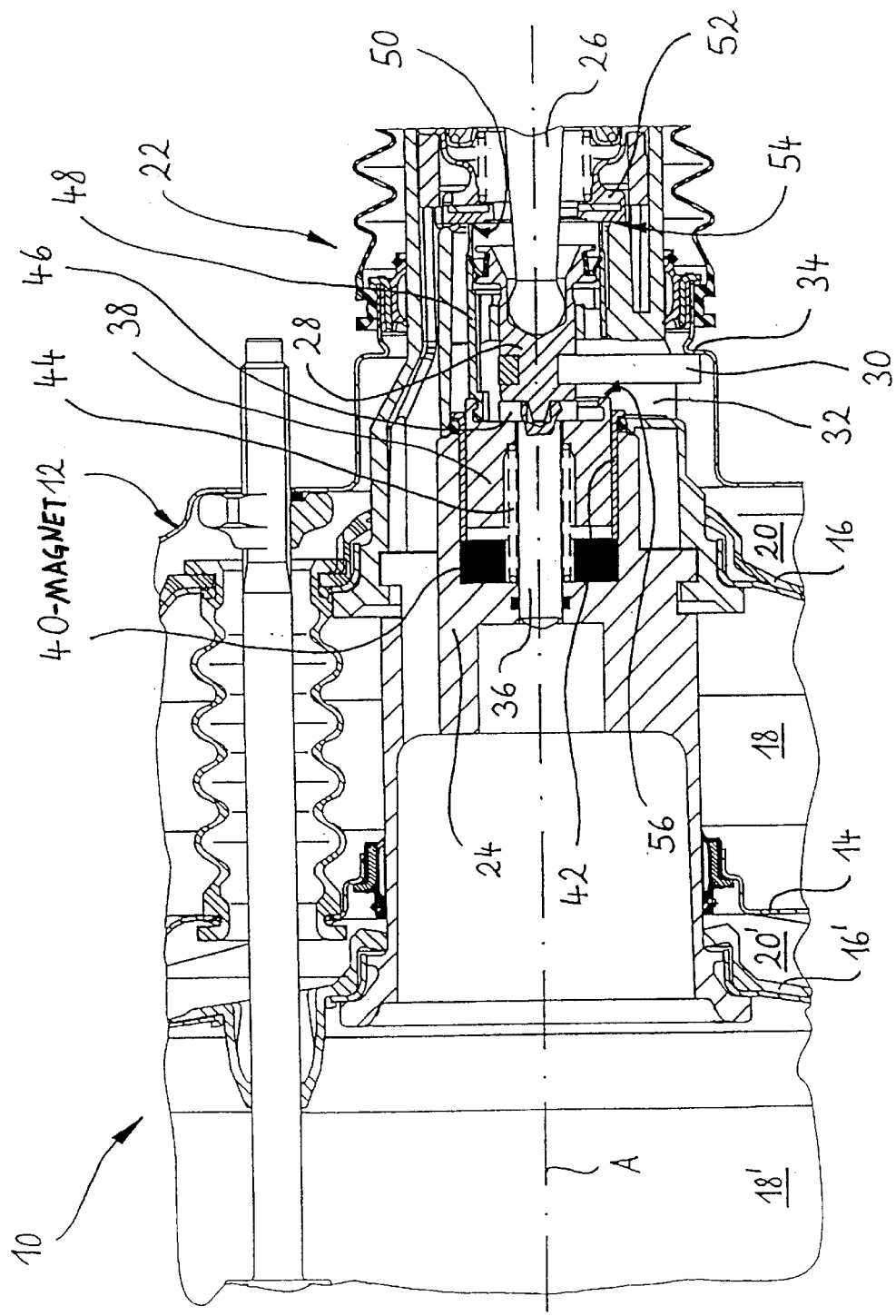
FIG. 1 a longitudinal section through the relevant region of a first embodiment of a vacuum brake booster according to the invention in a neutral position, FIG. 2 the view according to FIG. 1 in a first position of actuation, FIG. 3 the view according to FIG. 1 in a second position of actuation (braking assistance function), FIG. 4 the view according to FIG. 1 in a third position of actuation shortly before disconnection of the braking assistance function, FIG. 5 the view according to FIG. 1 during the return into the neutral position, FIG. 6 a second embodiment of a vacuum brake booster according to the invention in a view similar to FIG. 1 and in neutral position, FIG. 7 a graph illustrating the relationship between an applied input force and the braking force achieved thereby according to the various positions of actuation, FIG. 8 a third embodiment of a vacuum brake booster according to the invention in a view similar to FIG. 1 and in neutral position, FIG. 9 a fourth embodiment of a vacuum brake booster according to the invention in a view similar to FIG. 1 and in neutral position, FIG. 10 a fifth embodiment of a vacuum brake booster according to the invention in a view similar to FIG. 1 and in neutral position, FIG. 11 a sixth embodiment of a vacuum brake booster according to the invention in a view similar to FIG. 1 and in neutral position, FIG. 12 a seventh embodiment, similar to the embodiments illustrated in FIGS. 8 to 11, of a vacuum brake booster according to the invention in a view similar to FIG. 1 and in neutral position.
Figure 2:
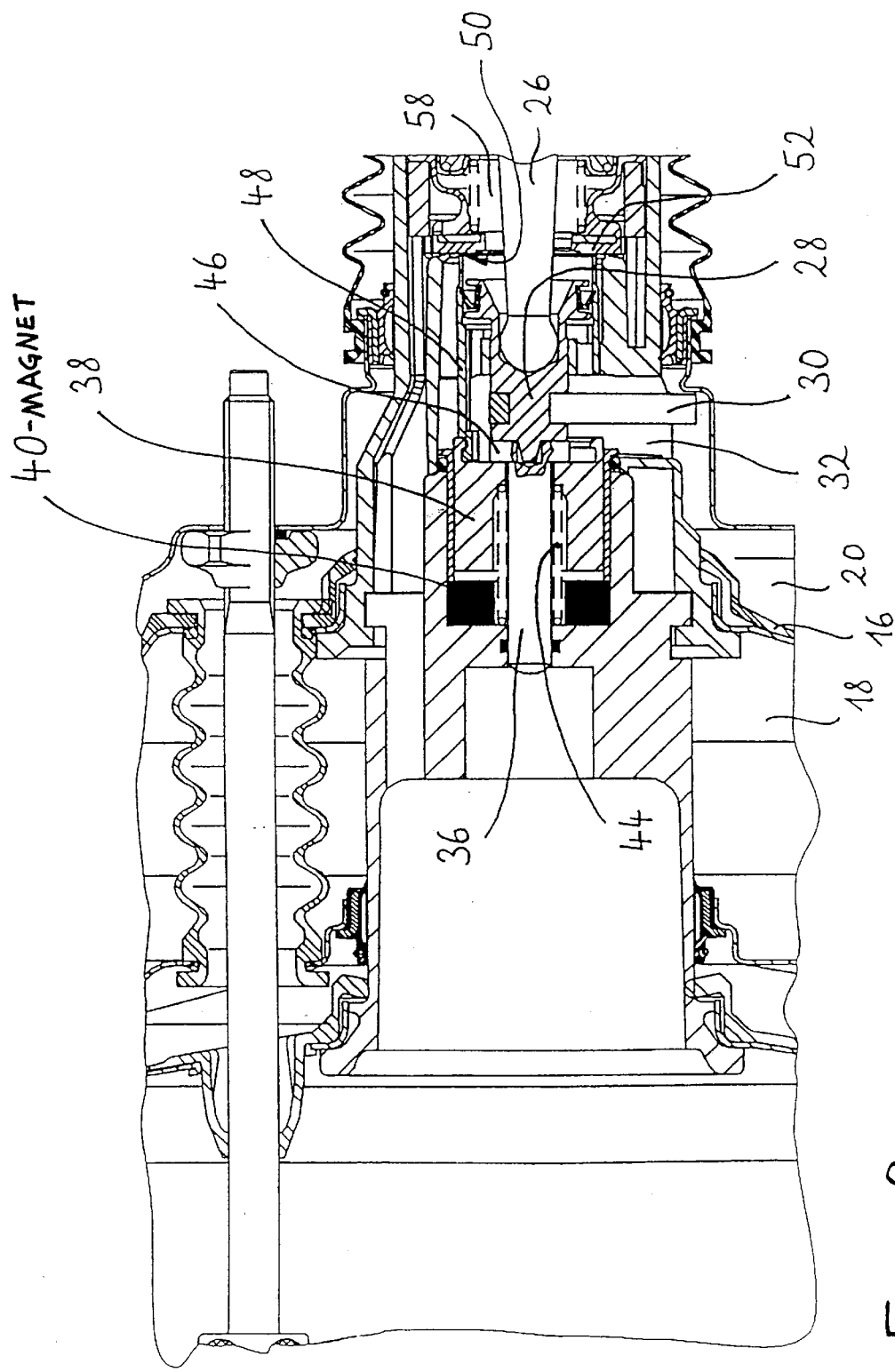
Figure 3:
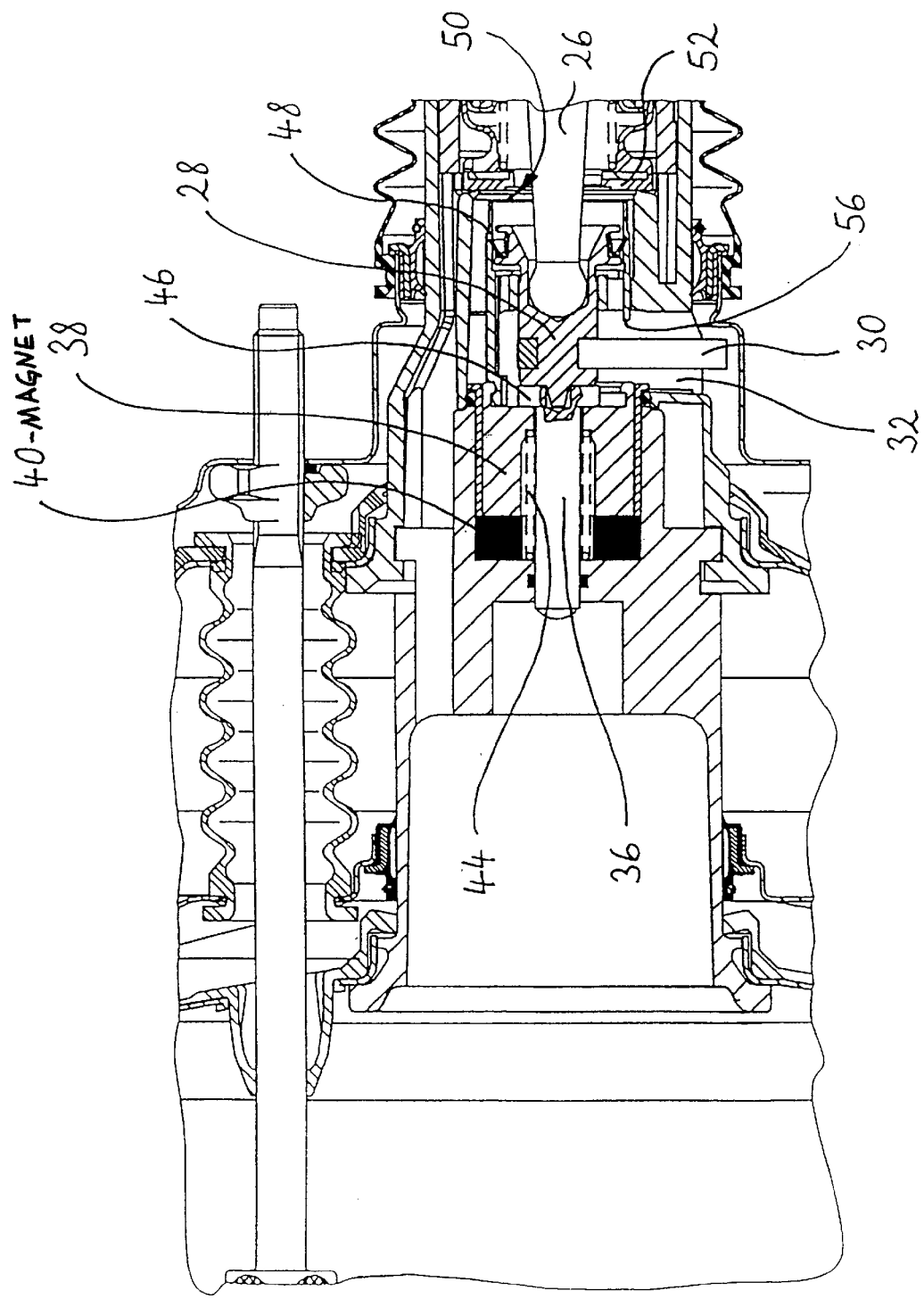
Figure 4:
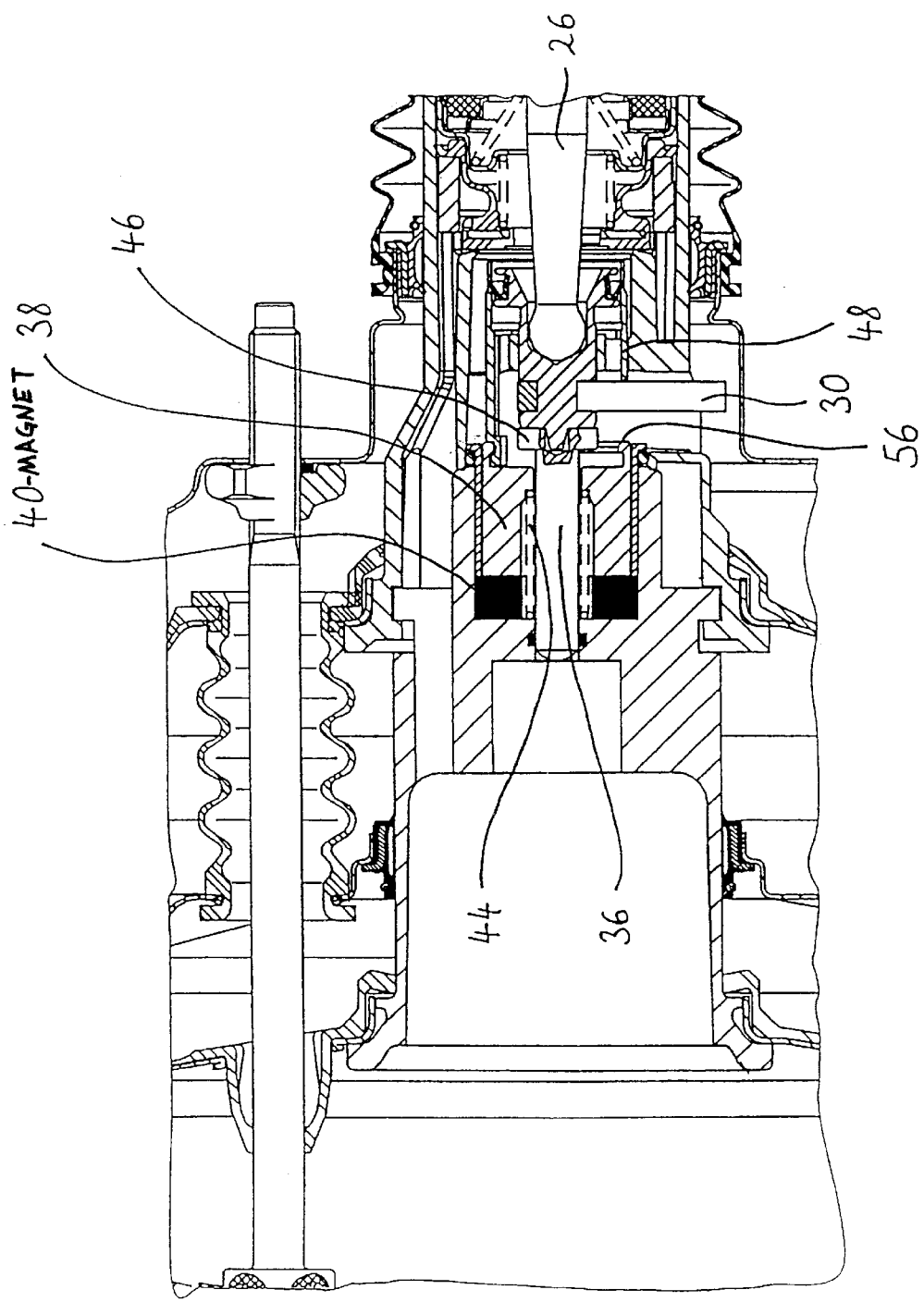
Figure 5:
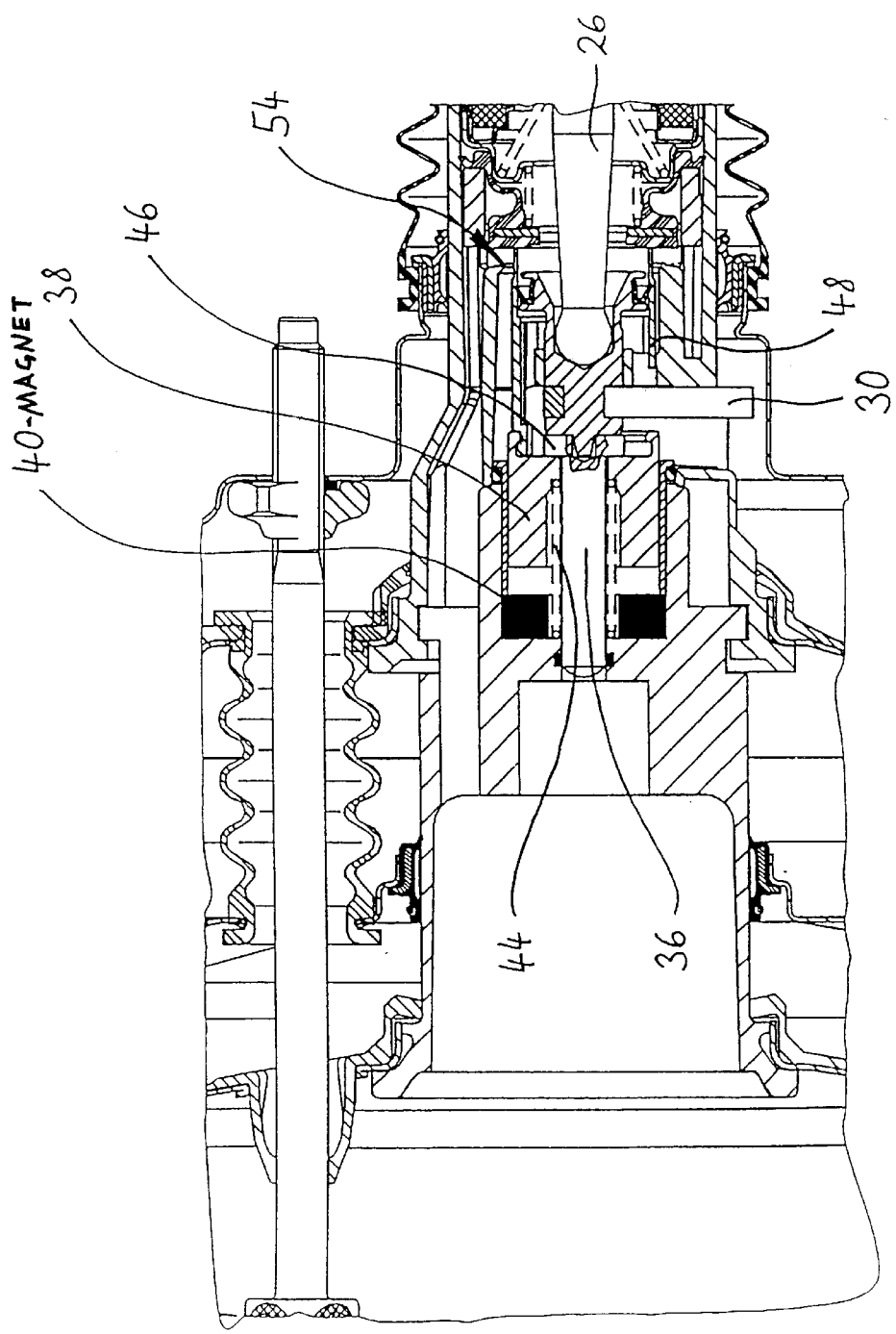

FIG. 1 shows a brake booster 10 having a housing 12, the interior of which is subdivided by a fixed wall 14 into two portions. In the one portion a movable wall 16 separates a vacuum chamber 18 from a working chamber 20, while in the other portion a further movable wall 16' separates a vacuum chamber 18' from a working chamber 20'.

During operation of the brake booster 10 the vacuum chambers 18, 18' are constantly connected to a vacuum source, e.g. to the intake tract of an internal combustion engine or to a vacuum pump. A control valve 22 having a housing 24 is provided either to establish a connection of the working chambers 20, 20' to the vacuum chambers 18, 18', so that the working chambers 20, 20' also are evacuated, or to establish a connection between the evacuated working chambers 20, 20' and the ambient atmosphere, i.e. the ambient pressure. The two movable walls 16, 16' are workingly coupled to the control valve housing 24. The illustrated style of construction of the brake booster with two vacuum chambers 18, 18' and two working chambers 20, 20' is known as a tandem style of construction. Often, however, vacuum brake boosters have only one vacuum chamber and one working chamber.

The brake booster 10 is operated by means of a rod-shaped input element 26, which is resiliently preloaded into its starting position, projects along an axis A into the control valve housing 24 and is fastened by its one, spherically designed end in a transmission piston 28.

Rigidly connected to the transmission piston 28 is a locking bar 30, which extends at right angles to the axis A away from the transmission piston 28 and through a channel 32 formed in the control valve housing 24. In the position shown in FIG. 1, the locking bar 30 rests against a stop 34 of the brake booster housing 12, which stop defines the neutral position of the control valve 22, i.e. the position which all of the components of the control valve 22 adopt relative to one another in the non-operated state of the brake booster 10. The side walls of the channel 32 limit the mobility of the locking bar 30 along the axis A, i.e. the maximum stroke of the locking bar 30 along the axis A is determined by the distance apart of the side walls of the channel 32.

The end of the transmission piston 28 remote from the spherically designed end of the input element 26 rests against a power output tappet 36 which transmits an actuating force, which is introduced via the input element 26 into the brake booster 10, to a master cylinder—disposed downstream of the brake booster and not shown here—of a vehicle hydraulic brake system. The power output tappet 36 penetrates a hollow-cylindrical armature 38 disposed concentrically therewith and an annular permanent magnet 40, which is likewise disposed concentrically with the power output tappet 36 and accommodated in a corresponding bore of the control valve housing 24 and fixed there by a clamping sleeve 42, which is simultaneously used to guide the armature 38.

The armature 38 cooperating with the permanent magnet 40 is displaceable along the axis A. A compression spring 44, which is disposed radially between the permanent magnet 40 and/or the armature 38 and the power output tappet 36 and is supported by its one end against the control valve housing 24 and by its other end against the armature 38, preloads the armature 38 resiliently counter to actuating direction and against an annular collar 46 formed on the power output tappet 36. The compression spring 44 ensures that there is an axial air gap between the armature 38 and the permanent magnet 40 in the neutral position of the control valve 22, i.e. that the armature 38 is held at a first distance from the permanent magnet 40.

Rigidly connected to the end of the armature 38 facing the input element 26 is a sleeve-shaped extension 48, on the free end of which a first annular valve seat 50 of the control valve 22 is formed. The first valve seat 50 cooperates with a valve sealing element 52 which is also annular and resiliently preloaded towards it and is adapted control the connection between the ambient atmosphere and the working chambers 20, 20' of the brake booster 10.

Formed radially outside of and concentrically with the first valve seat 50 and at the inside of the control valve housing 24 is a second annular valve seat 54 of the control valve 22, which valve seat likewise cooperates with the valve sealing element 52 and is adapted control the connection between the vacuum chambers 18, 18' and the working chambers 20, 20' of the brake booster 10.

As illustrated, the locking bar 30 projects through a recess 56 of the sleeve-shaped extension 48. In said recess 56 the locking bar 30 has, in the direction of the axis A, a play which is smaller than the maximum possible stroke of the locking bar 30 in the channel 32.

The mode of operation of the brake booster 10 is now described in detail with reference to FIGS. 1 to 5. Actuation of the brake booster 10 displaces the input element 26 into the brake booster 10 and/or the control valve 22, i.e. to the left in the drawings. Said displacement of the input element 26 is transmitted to the transmission piston 28 and from the latter to the power output tappet 36. The power output tappet 36, in said case, via its annular collar 46 simultaneously drives the armature 38 in actuating direction (see FIG. 2).

As a result of the displacement of the armature 38 the first valve seat 50 formed on the hollow-cylindrical extension 48 is lifted off the valve sealing element 52 so that ambient air may pass through a channel 58 surrounding the input element 26, past the open valve seat 50, through the channel 32 formed in the control valve housing 24, into the working chamber 20 and from there into the further working chamber 20'. A pressure difference then arises at the movable walls 16 and 16' and the resulting force is transmitted by the movable walls 16 and 16' to the control valve housing 24, which supplies said force to the already mentioned master cylinder, which is not shown here.

Thus, in dependence upon the displacement of the input element 26 relative to the control valve housing 24 the first valve seat 50 of the control valve 22 is opened to a greater or lesser extent, thereby producing a correspondingly increasing boosting force of the brake booster 10, which results from the pressure difference effective in each case at the movable walls 16, 16'.

In the case of conventional service braking operations, which are referred to here as normal braking operations, the input element 26 and hence also the armature 38 are displaced only relatively slightly in actuating direction. The compression spring 44 is designed in such a way that the restoring force it exerts upon the armature 38 during such normal braking operations is greater than the force of the permanent magnet 40 which force attempts to pull the armature 38 in actuating direction, i.e. to the left in the drawings. Thus, the first valve seat 50 during a normal braking operation is rigidly coupled to the input element 26 not only in actuating direction (via the transmission piston 28, the annular collar 46 of the power output tappet 36, as well as the armature 38 and its sleeve-shaped extension 48)

but also counter to actuating direction (via the sleeve-shaped extension 48 connected to the armature 38, the armature 38 pressed by the compression spring 44 against the annular collar 46, and the transmission piston 28). Each displacement of the input element 26 is accordingly transmitted without delay to the first valve seat 50.

If an actuating force initially applied to the input element 26 in the course of a normal braking operation is not increased, the valve sealing element 52 in the course of displacement of the control valve housing 24 comes back into contact with the first valve seat 50 so that the air supply to the working chambers 20 and 20' is interrupted (position of equilibrium, both valve seats 50 and 54 closed).

However, when actuation of the input element 26 is effected quickly and with a relatively large stroke, such as is typical of panic braking (emergency braking operation), the armature 38 moves more closely towards the permanent magnet 40 so that, once the armature 38 is less than a second distance away from the permanent magnet 40 which is less than the previously described first distance, the force of the compression spring 44 is no longer sufficient to keep the armature 38 remote from the permanent magnet 40. Instead, the force exerted by the permanent magnet 40 upon the armature 38 is then preponderant and the latter moves into contact with the permanent magnet 40 (see FIG. 3). Thus, the maximum possible opening cross section of the first valve seat 50 is attained and ambient air flows into the working chambers 20, 20' until the maximum possible differential pressure and hence the maximum possible boosting force of the brake booster 10 is achieved (so-called full-output point of the brake booster).

Since the armature 38 in coming into contact with the permanent magnet 40 has detached itself from the annular collar 46 of the power output tappet 36, the first valve seat 50 is uncoupled from the input element 26 and therefore remains open even if a driver using the brake booster 10 at a further stage of the emergency braking operation is no longer capable of fully applying the requisite input force. In other words, even if the input element 26 at a further stage of the emergency braking operation, because of the high reaction forces which then set in, is displaced slightly counter to actuating direction, this does not lead to closure of the first valve seat 50 because said restoring movement of the input element 26 is not transmitted to the first valve seat 50.

It is only when the return stroke of the input element 26 is great enough for the locking bar 30 to come into contact with the, in the drawings, righthand edge of the recess 56 of the sleeve-shaped extension 48 (see FIG. 4) that the restoring force acting upon the input element 26 is transmitted to the armature 38 and is sufficient to detach the armature 38 from the permanent magnet 40. The first valve seat 50 then comes into contact with the valve sealing element 52 and displaces the latter counter to actuating direction, with the result that the second valve seat 54 is opened and a connection is established between the working chambers 20, 20' and the vacuum chambers 18, 18' (see FIG. 5). The working chambers 20, 20' are therefore evacuated and there is a return to the initial state illustrated in FIG. 1.

From the above description it is apparent that it is ultimately the compression spring 44 which defines the tripping threshold of the braking assistance function. Said tripping threshold may not be set too low, otherwise this might lead to unintentional full brake applications, but on the other hand it should not be set too high in order, in the case of a driver possessing less strength, to enable the desired tripping of the braking assistance function in the course of an emergency braking operation.

Figure 6:
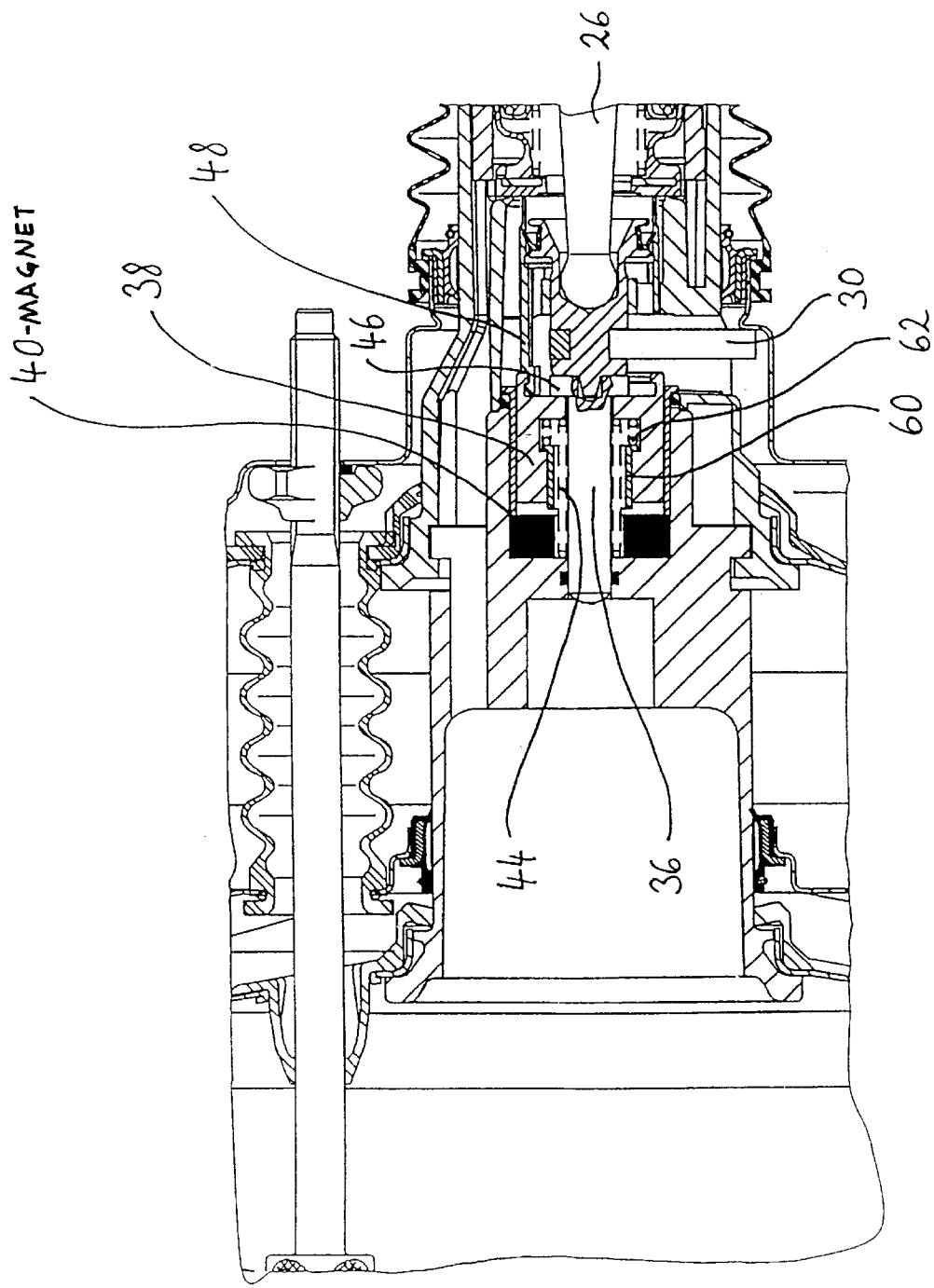

FIG. 6 shows a slightly modified second embodiment of the brake booster 10. In said embodiment there is provided between the armature 38 and the compression spring 44 surrounding the power output tappet 36 a spacer sleeve 60, which is disposed coaxially with the armature 38 and the power output tappet 36 and is displaceable relative to the armature 38. A compression spring 62 clamped axially between the armature 38 and the spacer sleeve 60 preloads the spacer sleeve 60 relative to the armature 38 in such a way that the free end of the spacer sleeve 60, in the neutral position of the control valve 22 shown in FIG. 6, projects axially from the armature 38 in the direction of the permanent magnet 40.

The second embodiment operates in principle in the same way as the first embodiment except that it offers the following advantage: so long as the spacer sleeve 60 projecting from the armature 38 does not have its end face, which faces the permanent magnet 40, in contact with the permanent magnet 40, the user of the brake booster 10 upon actuation of the same only has to overcome the force of the compression spring 44. It is only when the spacer sleeve 60 is in contact with the permanent magnet 40 and there is subsequently a further displacement of the armature 38 in actuating direction that the force of the second compression spring 62 also retroacts upon the input element 26.

Given the arrangement according to the second embodiment, some of the resilient preloading force of the armature 38 defining the tripping threshold of the braking assistance function is taken over by the second compression spring 62. This means that, compared to the first embodiment, the compression spring 44 is of a weaker design, resulting in lower actuating forces for normal braking operations. By means of said arrangement it is accordingly possible to vary the tripping threshold of the braking assistance function within wide limits without altering the actuating force to be applied by a driver during a normal braking operation.

Figure 7:
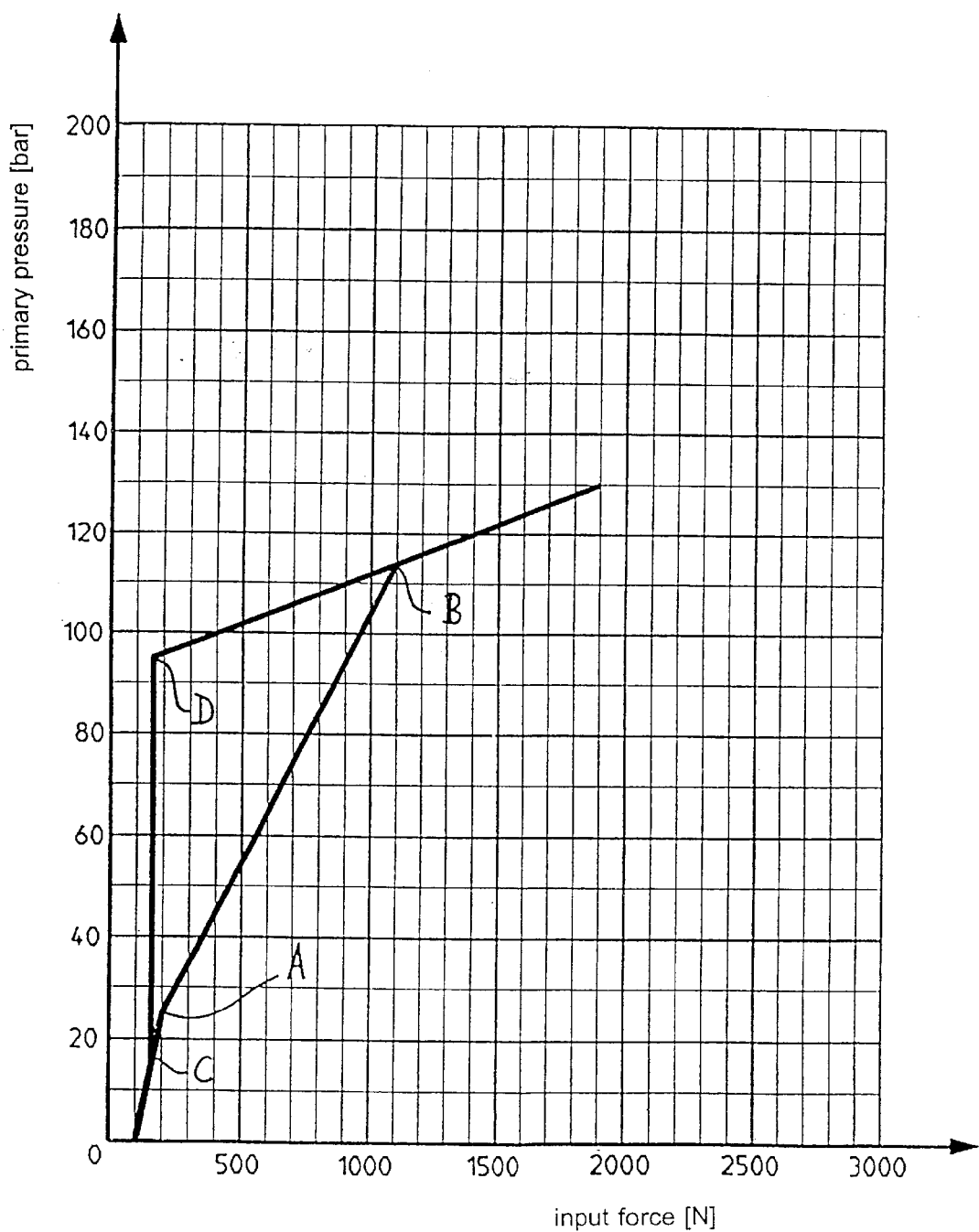

FIG. 7 shows the mode of operation of the brake booster 10 in the form of a graph. In said graph the input force exerted upon the input element 26 is plotted against a resulting hydraulic pressure in the primary chamber of the master cylinder disposed downstream of the brake booster 10 and not shown here. The line running via the point A up to a full-output point B of the brake booster 10 here represents a conventional characteristic curve for a normal braking operation of a unit comprising a vacuum brake booster 10 and a hydraulic master cylinder coupled thereto and not shown here. The point C represents the undershooting of the second distance of the armature 38 from the permanent magnet 40 in the course of panic braking (emergency braking operation) which occurs when actuation of the brake pedal is effected quickly and with a greater stroke. From point C onwards, the boosting force is increased up to a full-output point D of the brake booster 10 (braking assistance function). From the full-output point D onwards, an increase of the actuating force only has an effect in accordance with the power transmission determined by the hydraulically effective diameter of the master cylinder without any further power being contributed by the brake booster 10.

Figure 8:
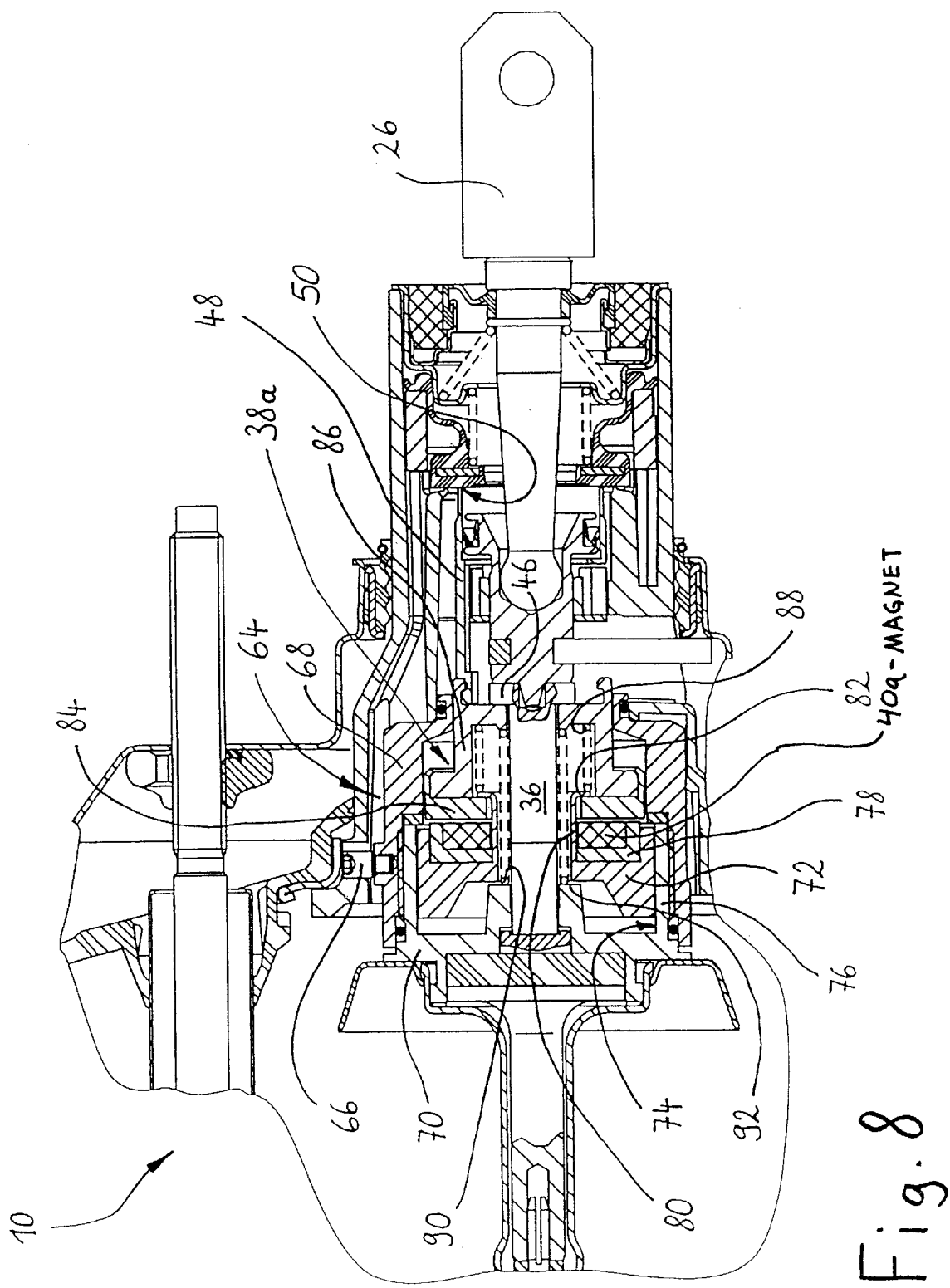

FIG. 8 shows a third embodiment of the brake booster 10 which, compared to the second embodiment shown in FIG. 6, allows an even greater reduction of the response force which has to be surmounted by a driver during a normal braking operation.

Unlike the first two embodiments, the third embodiment has a housing 64 for the magnetic device comprising the armature 38a and the permanent magnet 40a. The magnetic device housing 64 is fixed in the control valve housing 24 by means of a screw 66 and comprises a pot-shaped part 68 having a lid 70 screwed therein and sealed.

Disposed in the interior formed by the housing 64 are the armature 38a and the permanent magnet 40a, through which, as in the first two embodiments, the power output tappet 36 extends. A substantially hollow-cylindrical fettering component 72 likewise disposed in the housing 64 couples the armature 38a and the permanent magnet 40a into a unit, which is displaceable in the housing 64 along the axis A and the movement of which is guided by the fettering component 72. To said end, the fettering component 72 is situated with its outer peripheral surface in sliding contact with a corresponding inner surface 74 of a hollow-cylindrical extension 76, which extends from the lid 70 into the pot-shaped part 68 of the magnetic device housing 64.

The fettering component 72 in its end face facing the armature 38a has an annular recess containing a magnet holder 78, which is L-shaped in cross section and in turn carries the annular permanent magnet 40a. A sleeve-shaped extension 80 extends radially at the inside from the fettering component 72 coaxially with the axis A, past the magnet holder 78 and the permanent magnet 40a and into the hollow-cylindrical armature 38a. Formed on the free end of said hollow-cylindrical extension 80 is a radially outward projecting circumferential collar 82, which engages behind an annular magnetic plate 84 firmly connected to a substantially pot-shaped base 86, the latter two parts together forming the armature 38a. A first compression spring 88 is supported axially between the collar 82 of the fettering component 72 and the bottom of the base 86 of the armature 38a so that the permanent magnet 40a firmly connected to the fettering part 72 and the magnetic plate 84 of the armature 38a firmly connected to the base 86 are held at a defined axial distance from one another.

A second compression spring 90, which surrounds the power output tappet 36 and has a smaller diameter than the first compression spring 88, is supported in the magnetic device housing 64 by its one end against a hollow-cylindrical stop 92 which, radially inside the hollow-cylindrical extension 76, projects from the lid 70 into the housing 64. With its other end the compression spring 90 is supported against the bottom of the base 86, which at its opposite end is supported, as in the first two embodiments, against the annular collar 46 of the power output tappet 36. The second compression spring 90 therefore preloads the displaceable unit of armature 38a and permanent magnet 40a counter to the actuating direction of the brake booster 10. The distance, by which the displaceable unit may be displaced in actuating direction in the housing 64, is defined by the axial clearance between the stop 92 and the fettering component 72.

The third embodiment operates as follows:

A displacement of the input element 26 in actuating direction is transmitted from the transmission piston 28 to the power output tappet 36 and from the latter to the armature 38a, more precisely to the latter's base 86. So long as the fettering component 72 is not resting against the stop 92, a displacement of the input element 26 in actuating direction leads to an equally great displacement of the unit of armature 38a and permanent magnet 40a in the magnetic device housing 64 counter to the force of the second compression spring 90. The first compression spring 88 in said case transmits the displacement of the base 86 to the fettering component 72 without being itself compressed, with the result that the axial clearance between the magnetic plate 84 of the armature 38a and the permanent magnet 40a does not alter. Just as in the first two embodiments, in the course of such a displacement the sleeve-shaped extension 48 coupled to the armature 38a is lifted off the valve sealing element 52 so that atmospheric pressure may flow through the now open first valve seat 50 into the working chamber 20 and the desired brake pressure build-up may occur.

If instead of a normal braking operation an emergency braking operation occurs, during which the driver actuates the input element 26 quickly and with great force, then the axial clearance between the fettering component 72 and the hollow-cylindrical stop 92 is rapidly surmounted. As soon as the fettering component 72 is resting against the stop 92, the armature 38a may be displaced relative to the permanent magnet 40 counter to the force of the compression springs 88 and 90, thereby reducing the distance between the permanent magnet 40a and the magnetic plate 84. If during said convergence of the magnetic plate 84 and the permanent magnet 40a the previously so defined second distance is undershot, the force of attraction of the permanent magnet 40a acting upon the armature 38a is greater than the oppositely directed force of the two compression springs 88 and 90 so that the armature 38a detaches itself from the annular collar 46 and moves into contact with the permanent magnet 40a with the result that, as in the previously described embodiments, the emergency braking assistance of the brake booster 10 is activated.

Disconnection of the emergency braking assistance is effected as in the first two embodiments.

From the above description of the mode of operation of the third embodiment it is apparent that, during a normal braking operation, with regard to the magnetic device only the force of the second spring 90, which is much weaker than the first spring 88, has to be surmounted, whereas to trip the emergency braking assistance the force of both springs 88 and 90 has to be surmounted. In said manner a brake booster, which responds sensitively with low actuating forces during normal braking operations, is achieved and at the same time it is ensured that unintentional tripping of the emergency braking assistance is avoided. The surmounting of the higher response force generated by the first compression spring which is necessary to trip the emergency braking assistance is not perceived as intrusive because said increased response force is so quickly surmounted by the—in an emergency braking situation—rapid and forceful manner of actuation of the brake booster 10 that it is practically imperceptible to the driver.

Figure 9:
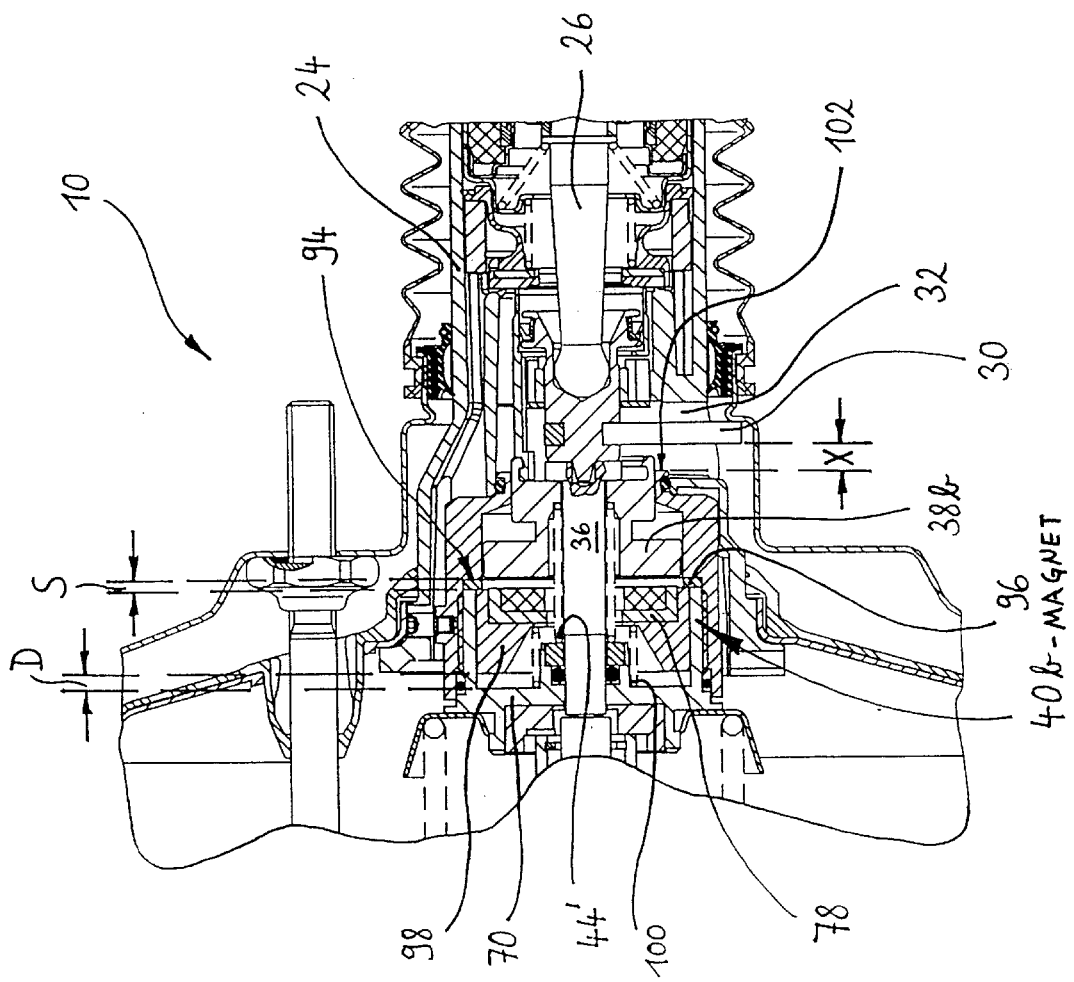

FIG. 9 shows a fourth embodiment of the brake booster 10, which differs from the previously illustrated embodiments in that a permanent magnet 40b is displaceably guided in the control valve housing 24 and/or magnetic device housing 64 and preloaded counter to actuating direction resiliently against a stop 94. In the embodiment according to FIG. 9, the stop 94 is formed by a plastic stop ring 96, which is supported in the magnetic device housing 64 and defines the first distance, here denoted by S, between the armature 38b and the permanent magnet 40b. By virtue of selecting stop rings 96 of differing axial extension the distance S may be adjusted, e.g. to compensate manufacturing tolerances.

As in FIG. 8, the permanent magnet 40b is fixed by means of the magnet holder 78, which in turn is accommodated in a guide body 98, which is similar to the fettering component 72 and is preloaded counter to the actuating direction of the brake booster 10 by means of a compression spring 100, which is supported against the lid 70 of the magnetic device housing 64. In the illustrated neutral position there is a distance D between the end face—facing away from the input element 26 of the guide body 98 and the bottom of the lid 70. In the illustrated embodiment, said distance is so selected that the sum of the distances D and S is at least slightly greater than a distance X, at which the locking bar 30 in its neutral position shown in FIG. 9 is situated from a stop face 102 in the channel 32 of the control valve housing. The distance X is accordingly the maximum stroke which the input element 26 may execute from its neutral position relative to the control valve housing 24. By virtue of the said selection of the distances D, S and X it is ensured that the guide body 98 does not come into contact with the bottom of the lid 70 even in the event of a rapid and forceful actuation of the input element 26. Unlike the previously described embodiments, therefore, the magnetic device need not transmit any forces from the input element 26 to the control valve housing 24 and hence may be of a less stable and therefore lighter design.

The fourth embodiment operates in a similar manner to the third embodiment. In the neutral position of the system shown in FIG. 9, the armature 38b and the permanent magnet 40b are separated from one another by the defined air gap S. During a normal braking operation, because of the movement of the input element 26 the armature 38b moves closer to the permanent magnet 40b and the spring 44', which preloads the armature 38b counter to actuating direction, is slightly compressed. As the control valve housing 24 during a normal braking operation has sufficient time to be displaced into the brake booster housing 12 (wherein the said displacement is as usual initiated by loading the working chamber 20 with atmospheric pressure, thereby resulting in a build-up at the movable wall 16 of the pressure difference leading to the displacement), there still remains between the armature 38b and the permanent magnet 40b a residual air gap S'<S, which is large enough to prevent the armature 38b coming into contact with the permanent magnet 40b.

In the event of a very fast, panicky actuation of the input element 26, on the other hand, the compression spring 44' is compressed to such an extent that the previously defined second distance between the armature 38b and the permanent magnet 40b is undershot, with the result that the armature 38b is pulled into contact with the permanent magnet 40b. Thus, in the manner already described for the previous embodiments the emergency braking assistance of the brake booster 10 is activated.

Disconnection of the emergency braking assistance is effected as in the three previously described embodiments, i.e. the input element 26 has to be moved back counter to actuating direction until the locking bar 30 abuts a stop ring 104 connected to the sleeve-shaped extension 48. It is only then that the restoring force acting upon the input element 26 (see, for example, in FIG. 9 the restoring spring 106) is transmitted via the sleeve-shaped extension 48 to the armature 38b so that the latter detaches itself from the permanent magnet 40b.

Figure 10:
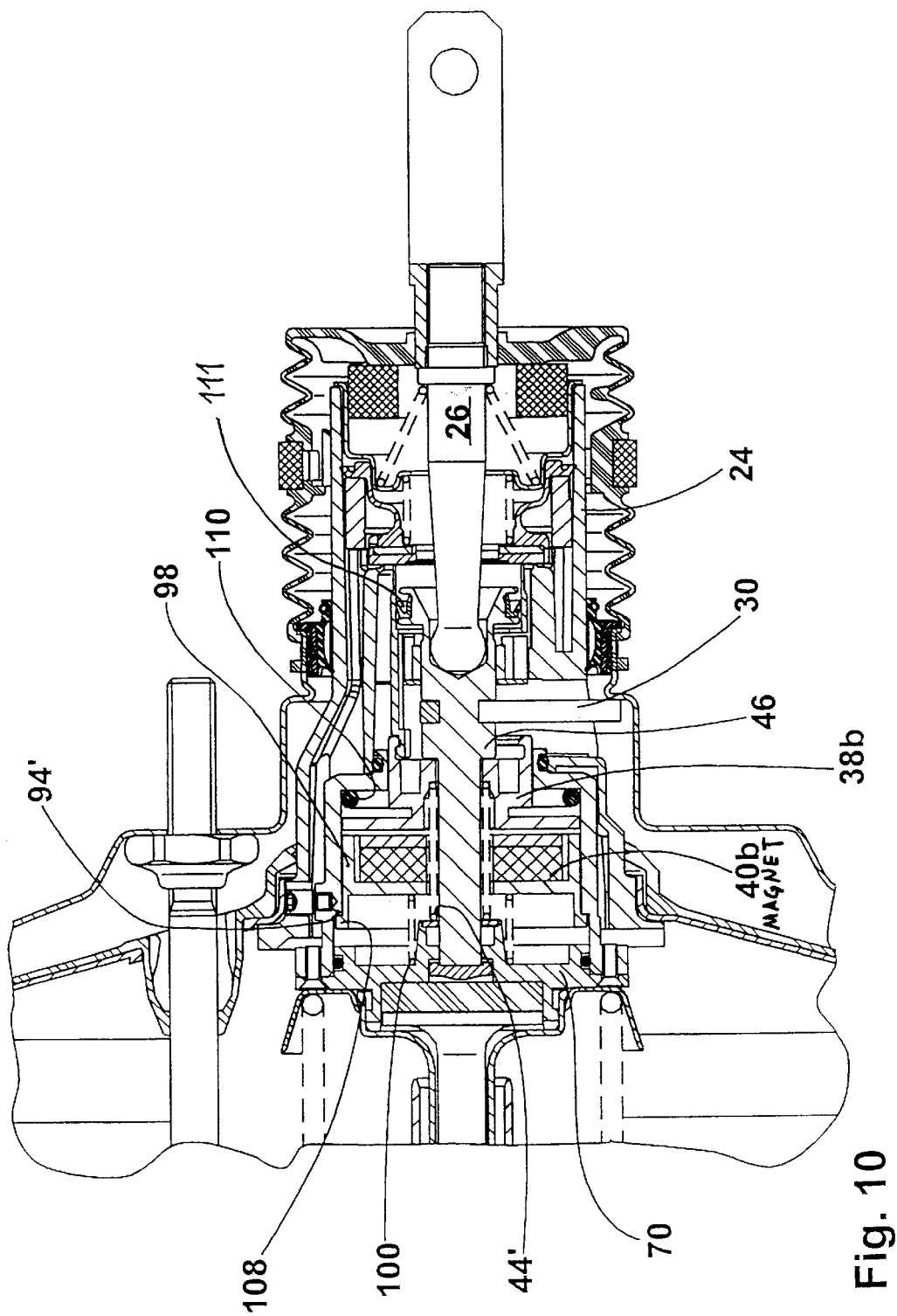

The fifth embodiment shown in FIG. 10 differs from the fourth embodiment substantially only in that there is no stop ring 96, the function of which is taken over by a stop 94' in the form of a housing step, against which a radially outward projecting stop collar 108 formed on the end of the guide body 98 adjacent to the lid 70 abuts. Furthermore, for damping the return movement of the armature 38b after its detachment from the permanent magnet 40b, an O-ring 110 made of elastomeric material is disposed in the illustrated manner in the magnetic device housing 64. Although not illustrated, such an O-ring may be used to advantage also in the other embodiments. In the neutral position shown in FIG. 10 there is again the rigid coupling of the input element 26 to the armature 38b by means of the annular collar 46 and the O-ring 110 has no influence upon functioning of the system. Alternatively and/or additionally a seal 111 (see FIG. 10) may also be fashioned in such a way that it damps the return movement of the armature 38b. For example, the seal 111 may be designed in such a way that the friction arising between it and the sleeve-shaped extension 48 during a rightward movement of the sleeve-shaped extension 48 relative to the seal 111 is greater than during an oppositely directed movement of the sleeve-shaped extension 48.

Figure 11:
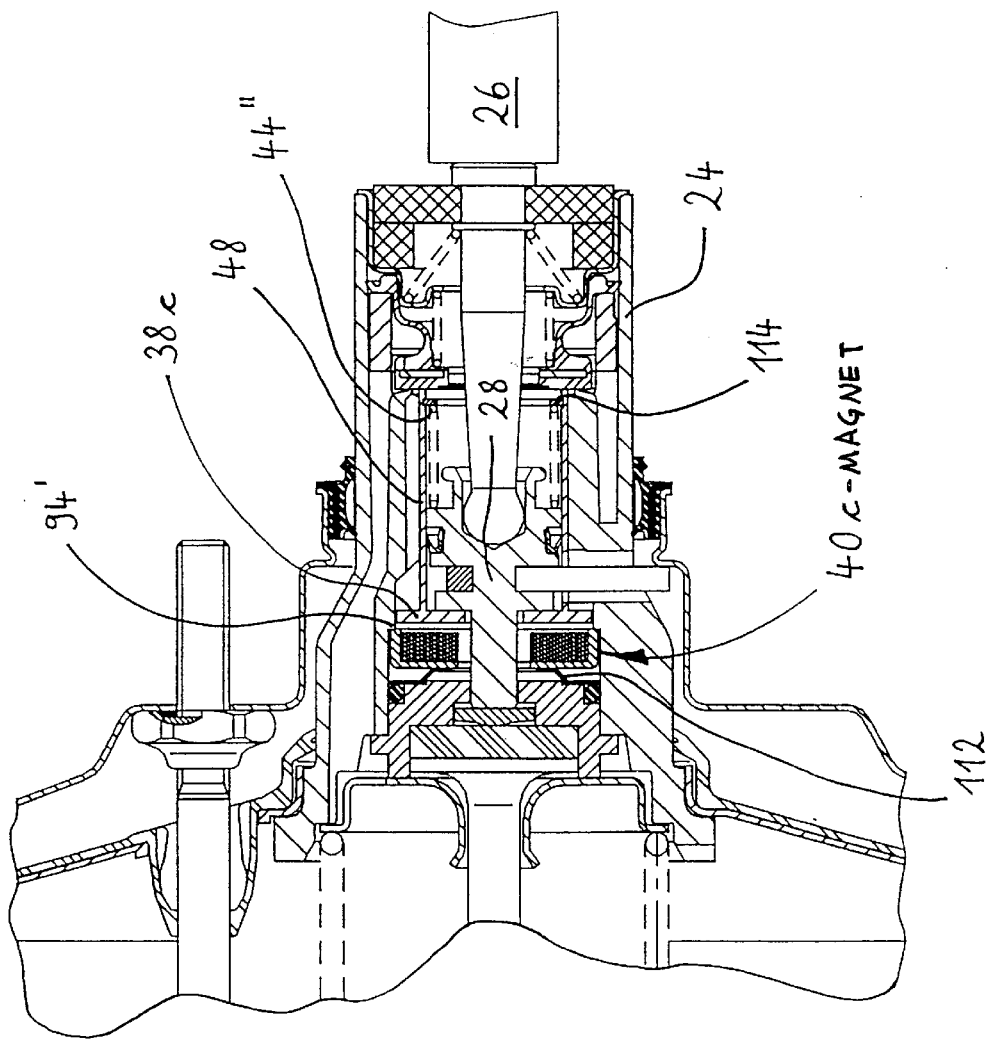

FIG. 11 finally shows a constructionally simplified sixth embodiment, the mode of operation of which corresponds to the fourth and fifth embodiment. As illustrated, the armature 38c has been shortened compared to the previously described embodiments and constructed integrally with the sleeve-shaped extension 48. The axial extension of the permanent magnet 40c and/or of the components accommodating the latter has also been shortened compared to the previous embodiments. To reduce the overall axial length further, the permanent magnet 40c is preloaded counter to actuating direction by an, on the whole, annular spring element 112 comprising a plurality of resilient segments of a circle. The compression spring 44", which preloads the armature 38c counter to acutating direction, is disposed in a space-saving manner radially between the sleeve-shaped extension 48 and the input element 26 and supported, as illustrated, on the one hand against the transmission piston 28, here integrally constructed with the power output tappet 36, and on the other hand against a ring 114 let into the sleeve-shaped extension 48.

The embodiments described below present further functional features which improve the operational performance of the vacuum brake booster 10 and/or simplify its manufacture. As the basic construction of the following embodiments is similar to the construction of the embodiments shown in FIGS. 8 to 11, the following description relates merely to different constructional details and the functional differences arising from them.

In the embodiments of the brake booster 10, in which the permanent magnet 40b, 40c is displaceable in the control valve housing 24 and the first distance between the permanent magnet and the armature is defined by a stop 94 or 94' (see FIGS. 9, 10 and 11), manufacturing tolerances may result in the faces of the permanent magnet 40b or 40c and the armature 38b or 38c facing each other, which are to come into contact with one another to activate the braking assistance function, not being plane-parallel to one another. To prevent a misalignment of the permanent magnet 40b or 40c and/or of the armature 38b or 38c, in the seventh embodiment shown in FIG. 12 the stop 94' is constructed obliquely relative to the axis A, wherein either the stop contact face 116 provided on the control valve housing 24 or the stop contact face 118 provided on the guide body 98' or alternatively both stop contact faces 116, 118 have a crowned shape. Furthermore, a radial play $S_r$ is provided between the guide body 98' and the control valve housing 24. In said manner, the permanent magnet 40d may always be aligned relative to the armature 38d in such a way that the contact faces of permanent magnet 40d and armature 38d are plane-parallel to one another.

Figure 12:
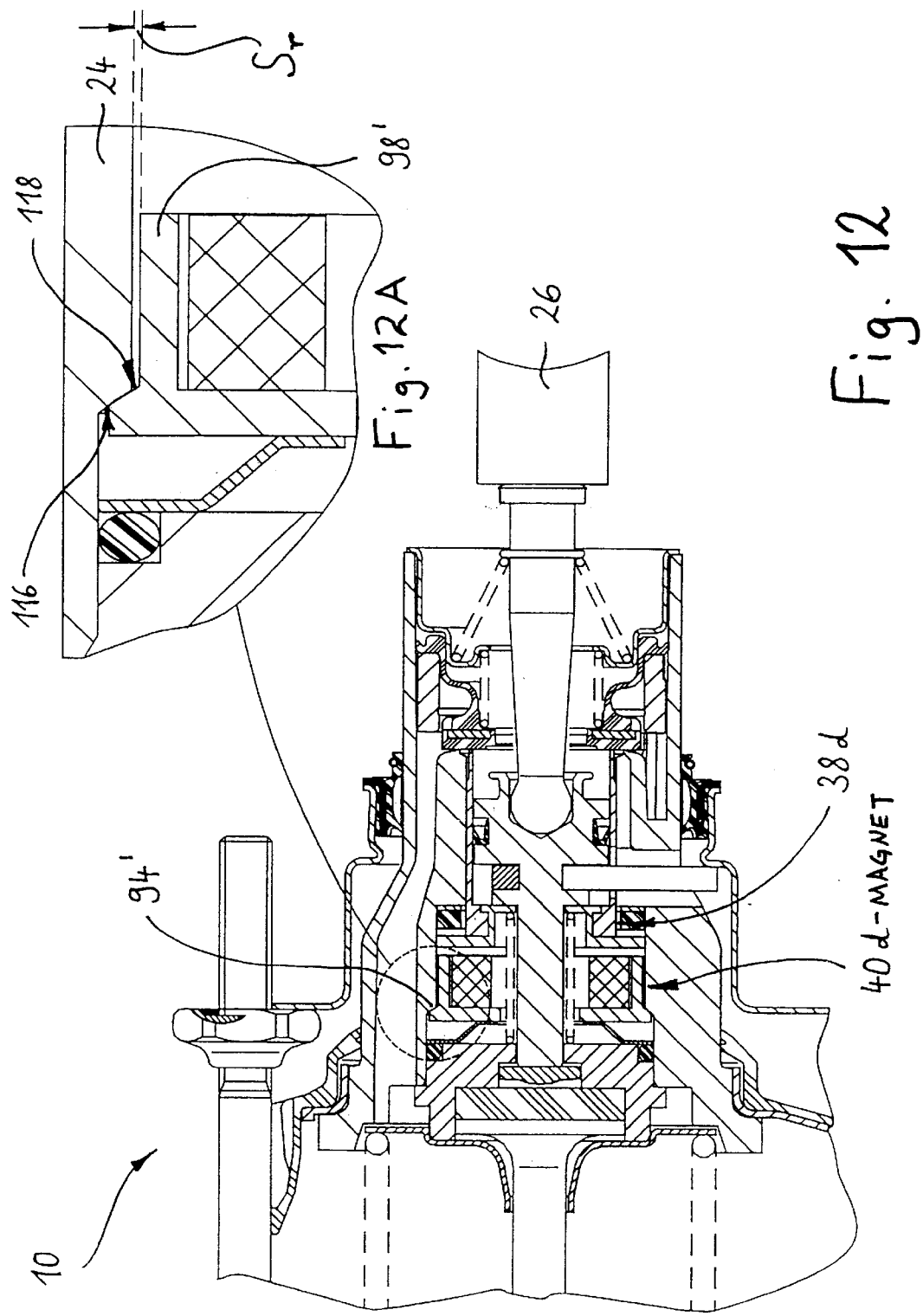
FIG. 12A is an enlarged view of a portion of the vacuum brake booster of FIG. 12.
Figure 13:
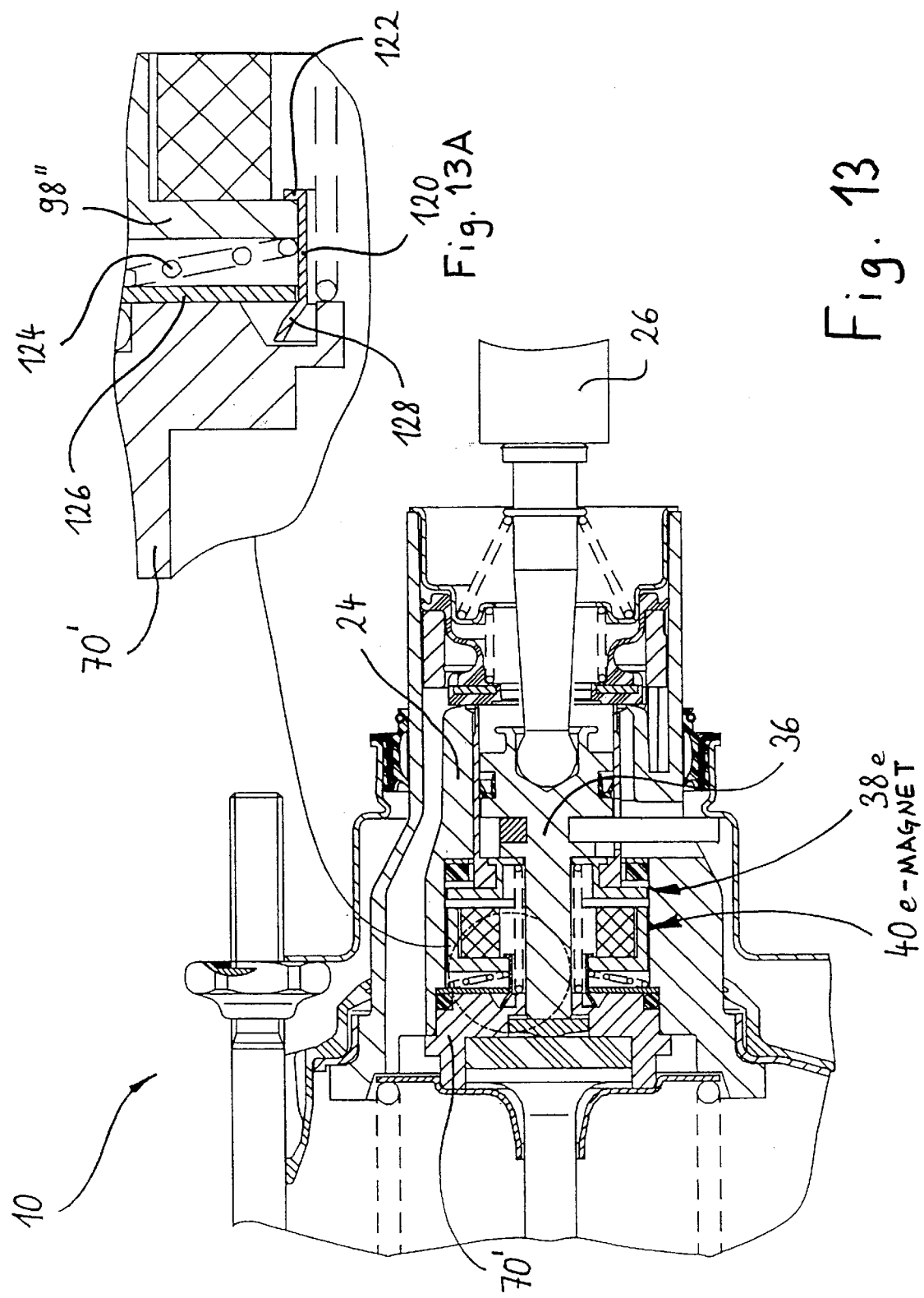
FIG. 13 an eighth embodiment, slightly modified compared to FIG. 12, of a vacuum brake booster according to the invention in a view similar to FIG. 1 and in neutral position.

The same result is achieved by the eighth embodiment shown in FIG. 13. There, a retaining sleeve 120 for the permanent magnet 40e is provided, which is coaxial with the power output tappet 36 and at its one end has a collar 122, against which the guide body 98" is pressed by a spring 124, which is supported against an annular disk 126, which is clamped sealingly between the control valve housing 24 and the lid 70'. At its other end, the retaining sleeve 120 has a convexly widened retaining flange 128, which is disposed obliquely like the stop 94' in FIG. 12, is manufactured e.g. by means of spherical widening and enables the permanent magnet 40e to align itself correctly relative to the armature 38e. Both in the seventh and in the eighth embodiment, a tilting of the permanent magnet 40d or 40e is possible only within the available radial play S (not shown in FIG. 13).

Figure 14:
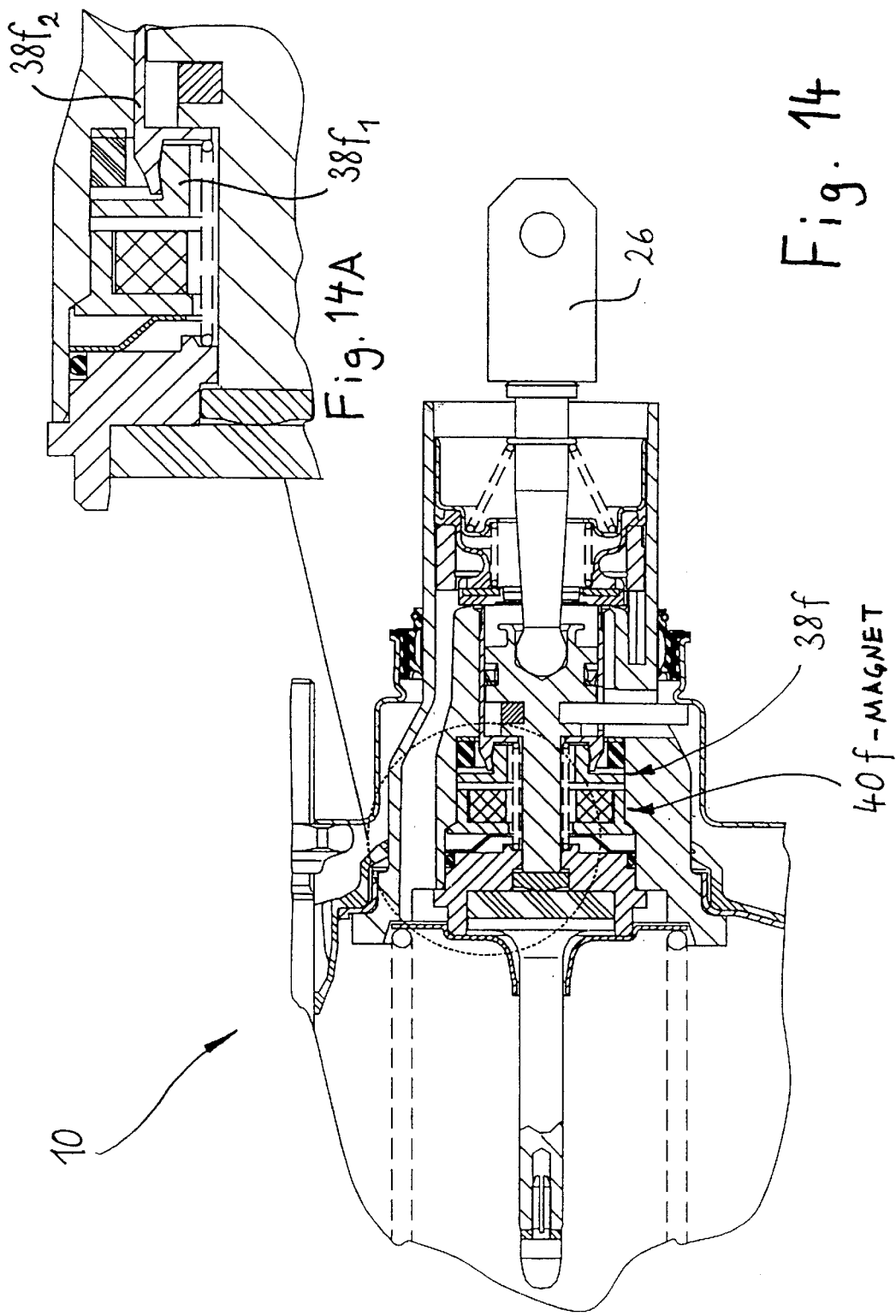
FIG. 14 a ninth embodiment, again modified compared to FIGS. 12 and 13, of a vacuum brake booster according to the invention in a view similar to FIG. 1 and in neutral position.

An alternative possibility for plane-parallel alignment of the contact faces of armature and permanent magnet is illustrated by the ninth embodiment shown in FIG. 14. In said embodiment the armature 38f is of a two-part construction, wherein the connection between the two parts $38f_1$ and $38f_2$ is designed in the style of a ball joint so that the part $38f_1$ may be swivelled to a limited extent relative to the part $38f_2$. Between the radially outer edge of the part $38f_1$ and the inner wall of the control valve housing 24 there is a radial play (not shown here), which enables said swivelling motion.

It is generally desirable to make the first distance, which is provided between the armature and the permanent magnet in the neutral position of the control valve 22, as large as possible so that in the neutral position there are as few magnetic forces acting upon the armature as possible. Each magnetic force acting in the neutral position upon the armature namely has to be compensated by the springs provided in the control valve 22, with the result that the spring force is greater than is actually necessary, which in turn means that, when the control valve 22 is actuated by means of the input element 26, a higher force has to be applied. A large first distance between the armature and the permanent magnet however means that the armature has to travel a long way in the direction of the permanent magnet before it is less than the second distance away from the permanent magnet and so the braking assistance function is tripped. The first distance is therefore set relatively small so that the desired braking assistance function may, when required, also actually be tripped.

As a solution to the conflict of objectives described above, the tenth embodiment shown in FIGS. 15 to 17 comprises a lever arrangement 130, which acts upon the permanent magnet 40g and reduces the first distance $S_1$ between the permanent magnet 40g and the armature 38g shown in FIG. 15 to a distance $S_2$ as soon as the control valve 22 and/or the brake booster 10 is actuated. The distance $S_2$ is greater than the second distance which defines the tripping threshold for the braking assistance function. The armature 38g therefore only has to be moved from the distance $S_2$ towards the permanent magnet 40g in order, when it is less than the second distance away from the permanent magnet 40g, for the braking assistance function to be tripped in the manner described in connection with the previous embodiments.

In the illustrated embodiment, the lever arrangement 130 consists of an, on the whole, annular element 132 comprising a plurality of arms 134, which are each U-shaped in cross section. Each arm 134 is supported by its radially inner end against a step 136 of the power output tappet 36 and by its radially outer end against the permanent magnet 40g and/or the latter's guide body 98". Radially at the inside all of the arms 134 are connected to one another and form an opening, through which the power output tappet 36 extends.

Figure 15:
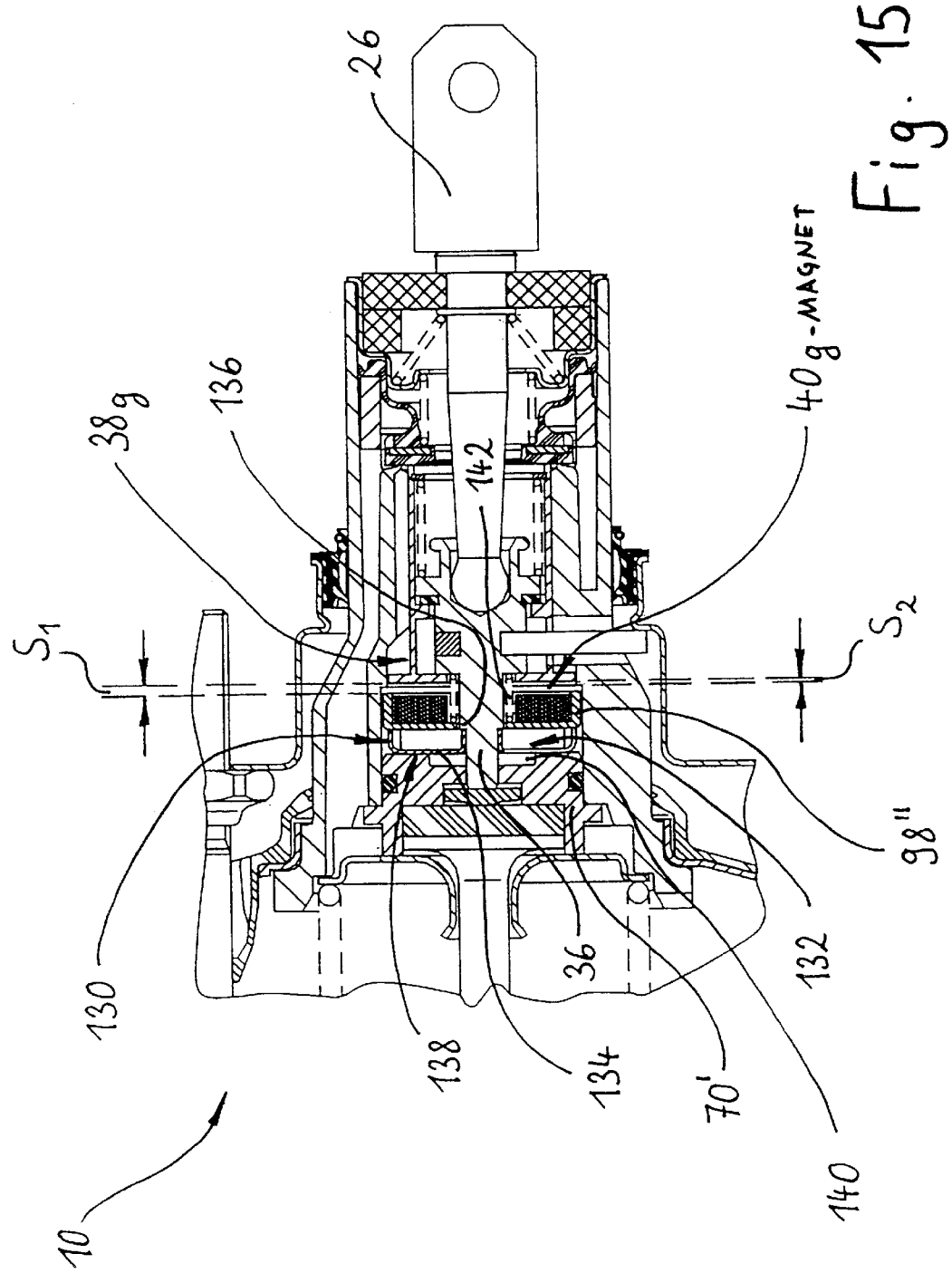
FIG. 15 a tenth embodiment of a vacuum brake booster according to the invention having a lever arrangement for adjusting a first distance between permanent magnet and armature in a view similar to FIG. 1 and in neutral position, FIG. 16 the tenth embodiment according to FIG. 15 with the braking assistance function switched on, FIG. 17 the tenth embodiment according to FIGS. 15 and 16 shortly before disconnection of the braking assistance function, FIG. 18 an eleventh embodiment of a vacuum brake booster according to the invention having a device for shortening the first distance between permanent magnet and armature in dependence upon a counterpressure arising during operation in a view similar to FIG. 1 and in neutral position, and FIG. 19 a twelfth embodiment modified compared to the eleventh embodiment, likewise having a device for shortening the first distance between permanent magnet and armature in dependence upon a counterpressure arising during operation.
Figure 16:
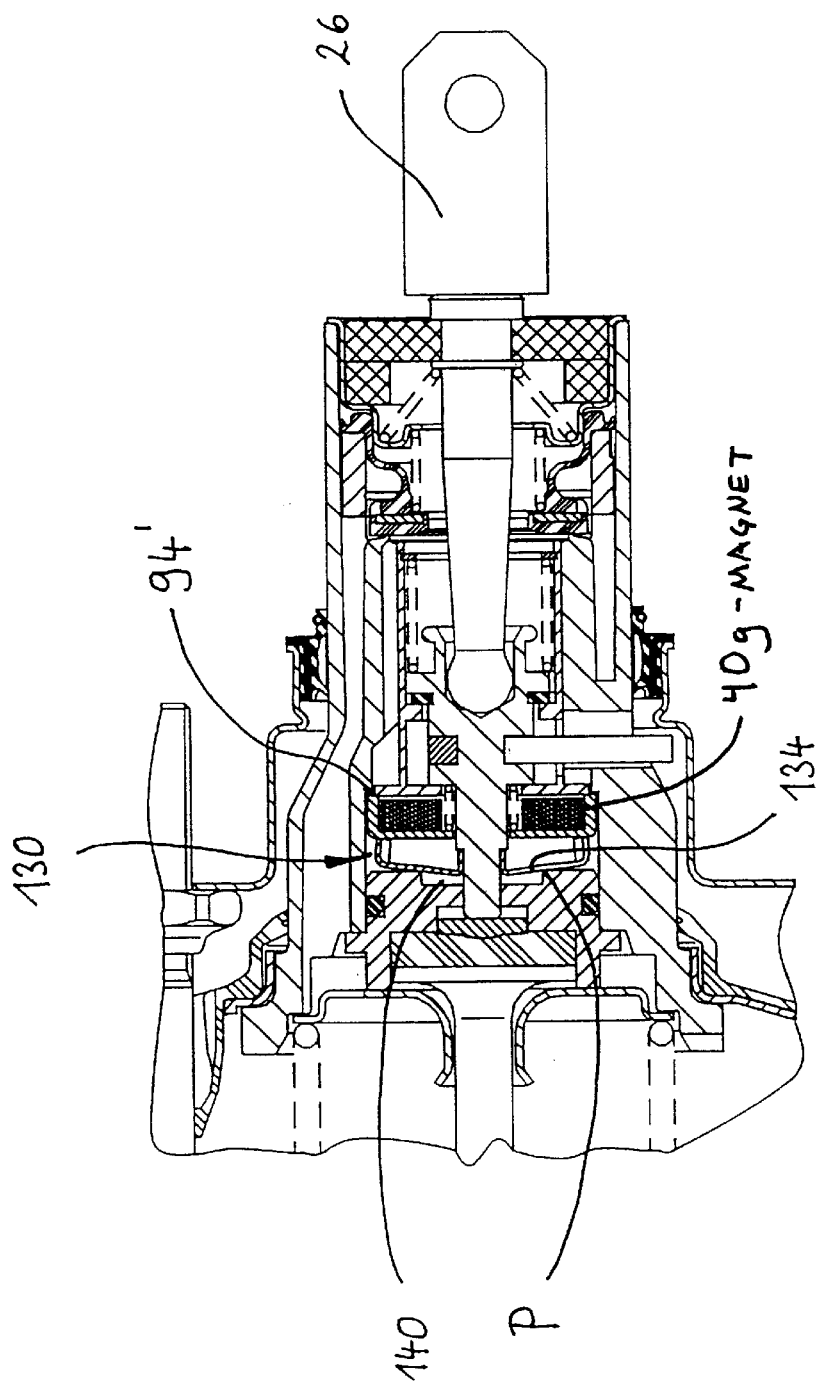

In the neutral position shown in FIG. 15 the element 132 rests with its base 138, which is formed by the arms 134, against the lid 70', which has a central recess 140. The permanent magnet 40g and/or the latter's guide body 98" is pressed into contact with the element 132 by means of a spring 142, which is supported against the power output tappet 36.

When the brake booster 10 is then operated, the input element 26 and hence also the power output tappet 36 are displaced into the control valve housing 24. The step 136 provided on the power output tappet 36 presses the radially inner end of each arm 134 into the recess 140 provided in the lid 70', whereupon each arm 134 tilts about a fulcrum P (see FIG. 16), which is formed in the lid 70' by the recess 140. The leftward movement of the radially inner ends of the arms 134 accordingly gives rise to an equally great but rightward movement of the radially outer ends of the arms 134, which is transmitted to the permanent magnet 40g and presses the latter, with simultaneous reduction of the first distance $S_1$ to $S_2$, against the stop 94' provided in the control valve housing 24. From said position the braking assistance function may then be reliably tripped (see FIG. 16).

Figure 17:
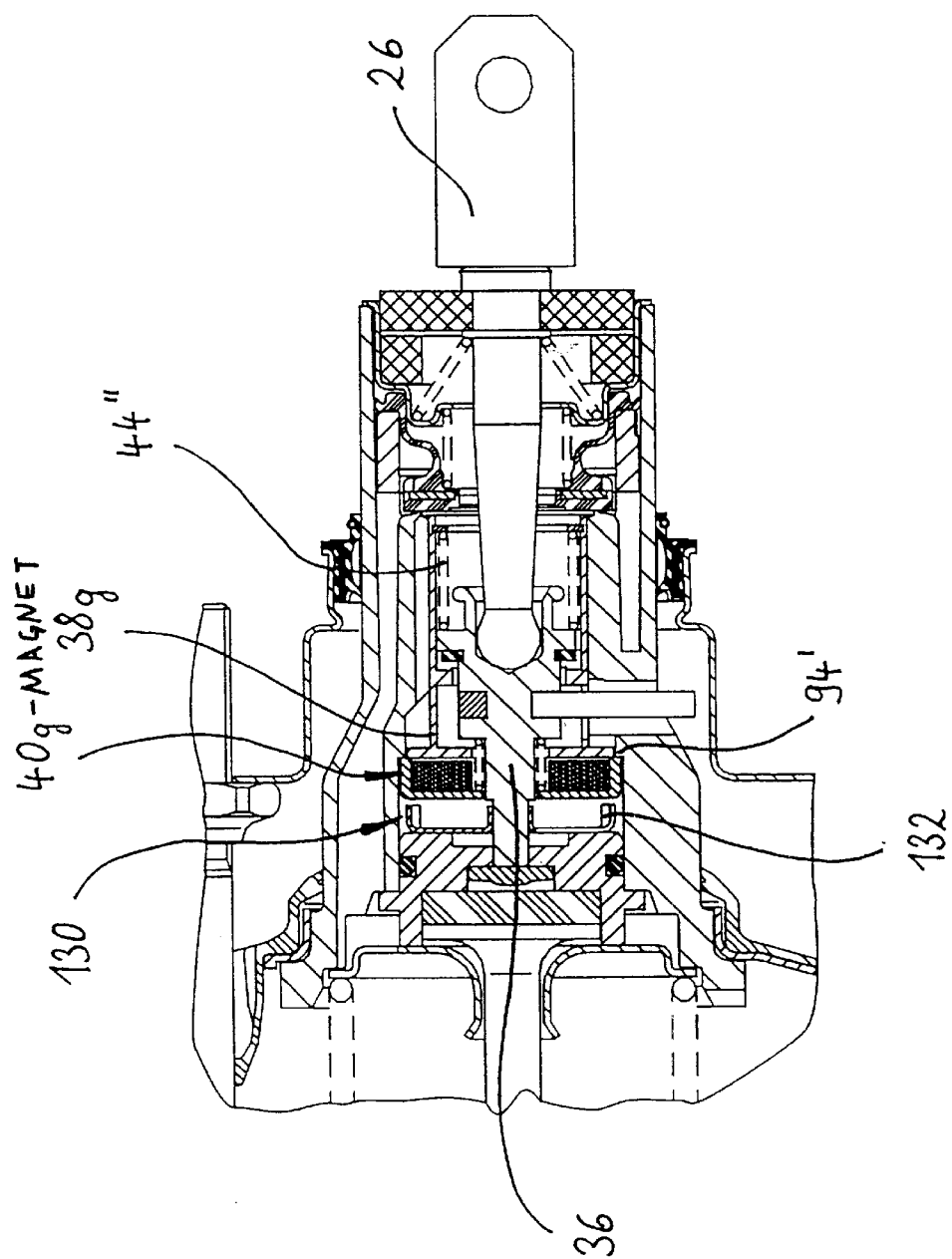

When the brake is released, the permanent magnet 40g first detaches itself from the element 132 but still remains in contact with the armature 38g (see FIG. 17). It is only when, upon a further return movement of the input element 26 and of the power output tappet 36 coupled thereto, the spring 44" is compressed because the permanent magnet 40g rests against the stop 94' and the armature 38g is still in contact with the permanent magnet 40g, that the counterforce acting upon the armature 38g finally increases to such an extent that the armature 38g breaks away from the permanent magnet 40g. The braking assistance function is therefore deactivated.

Figure 18:
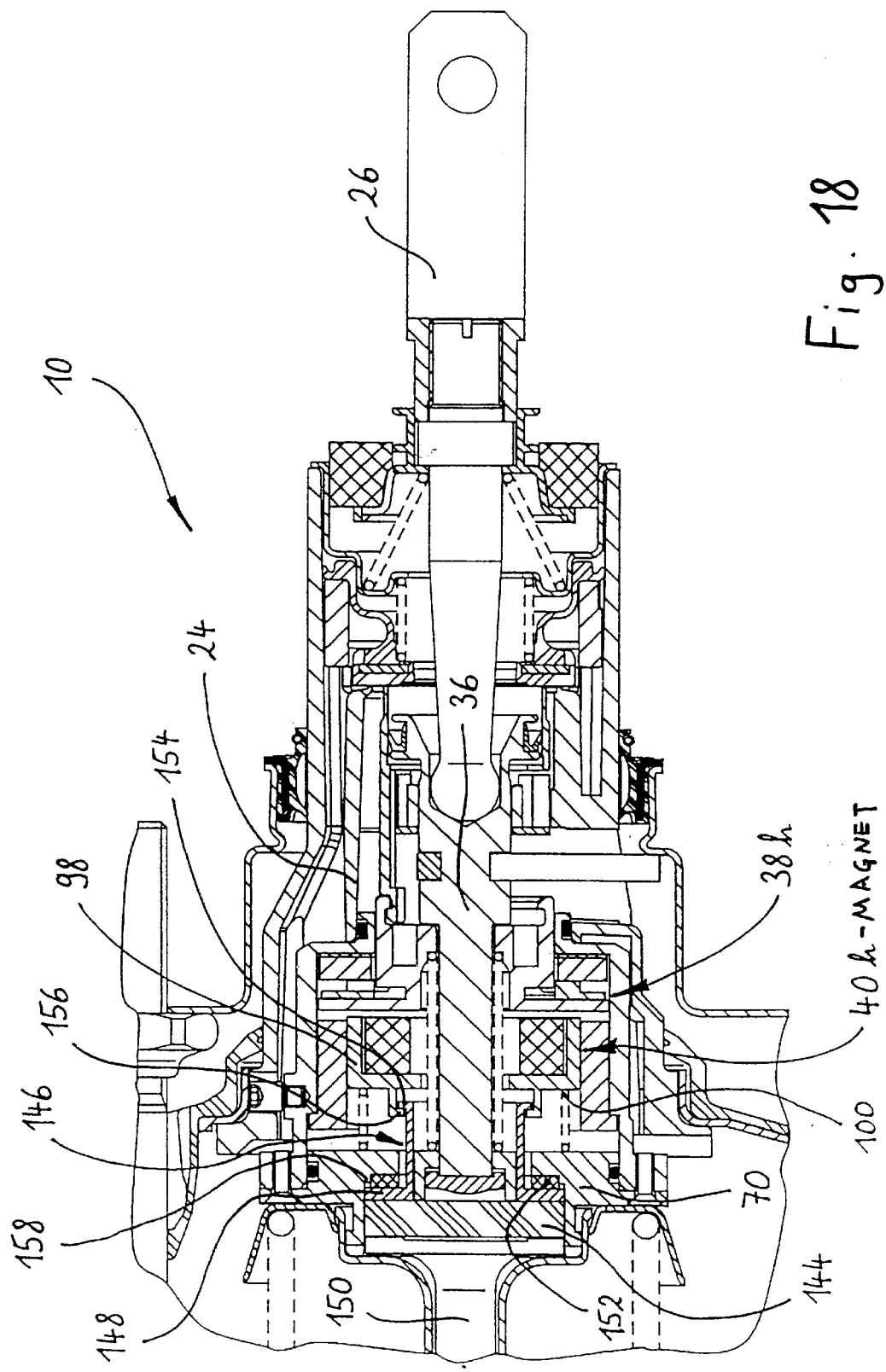
Figure 19:
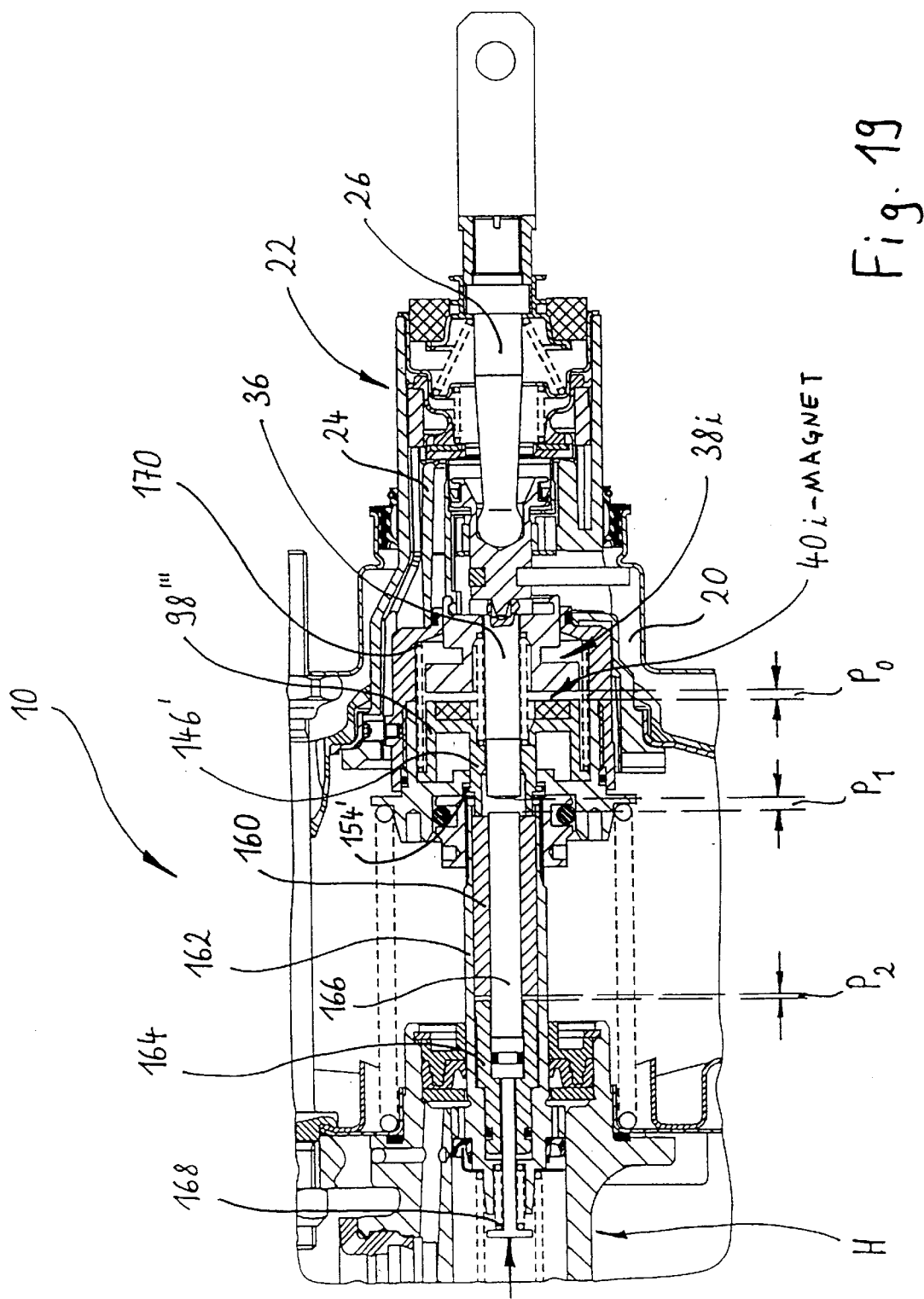

The embodiments illustrated in FIGS. 18 and 19 comprise a device, by means of which the first distance between the armature and the permanent magnet is reduced in dependence upon a counterforce F retroacting upon the brake booster 10. Said device is intended to achieve the effect whereby the work to be done by a driver in order to trip the braking assistance function (displacement of the input element 26 and/or power output tappet 36 multiplied by the force necessary for said purpose) remains substantially constant under all operating conditions. To displace the input element 26 from the neutral position requires only a small amount of work because as yet no pressure or only a low pressure has built up in a master cylinder H connected to the brake booster 10 (see FIG. 19), so that there is still no counterforce or only a low counterforce F retroacting via a reaction disk 144 made of elastomeric material upon the power output tappet 36. However, if the braking assistance function is to be tripped in the middle of a braking operation, this normally requires much more work because then the input element 26 and/or the power output tappet 36 has to be displaced against a now high pressure in the master cylinder and a resultant high counterforce F in order for the distance between armature and permanent magnet to be less than the second distance. The said device, which continuously reduces the first distance as the counterforce F increases, prevents said undesirable increase of the work needed to trip the braking assistance function.

According to the eleventh embodiment shown in FIG. 18, the said device comprises an adjusting sleeve 146 having a collar 148, against which the reaction disk 144 rests so that the counterforce F retroacting from a master cylinder via a tappet 150 is transmitted to the adjusting sleeve 146. In the embodiment according to FIG. 18, the adjusting sleeve 146 is supported via a resiliently compliant element, here an O-ring 152 disposed between the collar 148 and the lid 70 of the magnetic device housing 64, against the magnetic device housing 64 and via the latter against the control valve housing 24. At its end remote from the collar 148 the adjusting sleeve 146 is provided with a radially outward projecting annular collar 154, which provides a positive engagement with a correspondingly shaped, radially inward projecting annular collar 156 of the guide body 98. The spring 100 (see also FIG. 10) preloads the unit of permanent magnet 40h and guide body 98 against the annular collar 154, which here takes over the function of the stop 94.

The mode of operation is as follows: the higher the counterforce F becomes, the more the O-ring 152 is compressed and so the further the annular collar 154 moves in the direction of the armature 38h. The unit of permanent magnet 40h and guide body 98, which is resiliently preloaded against said annular collar 154, participates in said movement so that the permanent magnet 40h, as the counterforce F increases, moves closer and closer to the armature 38h. In order during said convergence to prevent unintentional undershooting of the second distance, which would lead to an undesired tripping of the braking assistance function, in the lid 70 a stop 158 is provided, which cooperates with the collar 148 of the adjusting sleeve 146 and which limits the said movement of the adjusting sleeve 146 to a safe amount.

FIG. 19 shows a twelfth embodiment, which is slightly modified compared to FIG. 18 and has no reaction disk 144. Unlike the embodiment according to FIG. 18, the adjusting sleeve 146' is rigidly connected to the permanent magnet 40i; in the illustrated embodiment the adjusting sleeve 146' is constructed integrally with the guide body 98'''. Instead of the reaction disk 144, a reaction sleeve 160 rests against the free end of the adjusting sleeve 146' and is used to transmit to the adjusting sleeve 146' the counterforce F retroacting from the master cylinder H.

The mode of operation of the arrangement shown in FIG. 19 is as follows: the already mentioned master cylinder H has a hollow-cylindrical primary piston 162, in which a stepped piston 164 is guided in a sealed manner. In the stepped piston 164 in turn a tappet 166 is guided in a sealed manner. The reaction sleeve 160 is disposed between the primary piston 162 and the tappet 166.

A spring 168 preloads the tappet 166 in actuating direction. As a result, in the neutral position shown in FIG. 19 the tappet 166 is drawn into contact with the stepped piston 164 and the stepped piston 164 is moreover drawn into contact with the primary piston 162. In said neutral position, between the tappet 166 and the power output tappet 36 there is a defined play $P_1$, which is smaller than a distance $P_0$ between the armature 38i and the permanent magnet 40i.

Upon actuation of the brake pedal (not shown here), i.e. upon displacement of the input element 26 to the left, first the play $P_1$ is surmounted and a reaction force at the brake pedal is not perceptible so long as the power output tappet 36 is not resting against the tappet 166. Thus, at the start of a low-force braking operation a rapid opening of the atmospheric valve in the control valve 22 is achieved (atmospheric pressure flows into the working chamber 20).

At a later stage of a braking operation, brake pressure builds up in the master cylinder H and acts upon the stepped piston 164 and the tappet 166. The stepped piston 164 therefore moves, together with the tappet 166, counter to actuating direction and in so doing surmounts a play $P_2$, which is provided in the neutral position between the reaction sleeve 160 and the stepped piston 164. As soon as said play $P_2$ is surmounted, the fluid pressure generated in the master cylinder H retroacts as counterforce F via the stepped piston 164 and the reaction sleeve 160 upon the adjusting sleeve 146'. When the counterforce F is sufficient to compress a spring 170, which preloads the permanent magnet 40i counter to actuating direction, the distance between the permanent magnet 40i and the armature 38i starts to become smaller. An annular collar 154' formed on the adjusting sleeve 146' in said case prevents the unintentional tripping of the braking assistance function caused by undershooting of the second distance between armature 38i and permanent magnet 40i.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Vacuum brake booster, comprising
   a vacuum chamber and a working chamber separated from one another in a pressure-proof manner by a movable wall, and
   a control valve comprising a housing workingly coupled to the movable wall and including a first valve seat disposed in said housing; wherein to achieve a pressure difference at the movable wall, the first valve seat is capable of controlling a supply of at least atmospheric pressure to the working chamber in dependence upon displacement of an input element of the brake booster,
   an armature, which cooperates with a permanent magnet, is disposed in the control valve housing and is connected to the input element for movement in actuating direction, wherein
   the armature is resiliently preloaded counter to said actuating direction and, in the starting position of the control valve, is held at a first distance from the permanent magnet, and wherein
   the armature, when less than a previously defined second distance away, from the permanent magnet smaller than the first distance, is pulled by the permanent magnet counter to the resilient preloading force acting upon the armature, into contact with the permanent magnet, thereby disconnecting said armature from said input element, wherein the first valve seat is coupled to the input element and to the armature and wherein the permanent magnet is guided displaceably in the control valve housing.

2. Vacuum brake booster according to claim 1, wherein the second distance is defined by the magnitude of the resilient preloading force acting upon the armature.

3. Vacuum brake booster according to claim 1, wherein the input element is resiliently preloaded counter to actuating direction.

4. Vacuum brake booster according to claim 1, wherein the return stroke movement of the armature, which occurs after its detachment from the permanent magnet, is damped by an elastomeric element.

5. Vacuum brake booster according to claim 1, wherein the permanent magnet is preloaded counter to actuating direction resiliently against a stop.

6. Vacuum brake booster according to claim 5, wherein one of the stop and a contact face cooperating with the stop and associated with the permanent magnet is crowned, and that there is a radial play between one of the permanent magnet and its mounting and the control valve housing.

7. Vacuum brake booster according to claim 5, wherein the stop is formed by a stop ring made of plastics material, which is supported in the control valve housing and the axial extension of which defines the first distance.

8. Vacuum brake booster according to claim 1, wherein an annular spring element comprising a plurality of resilient segments of a circle preloads the permanent magnet counter to the actuating direction.

9. Vacuum brake booster according to claim 1, wherein the permanent magnet is displaceable in the actuating direction relative to the control valve housing by a distance which is greater than a maximum possible actuating stroke of the input element minus the first distance.

10. Vacuum brake booster according to claim 1, wherein the armature and the permanent magnet are coupled together into a displaceable unit by means of a fettering component, which allows a convergence of the armature with the permanent magnet, and that the resilient preloading force defining the second distance acts upon the armature only when the displaceable unit of armature and permanent magnet rests against a stop, which prevents its displacement in actuating direction.

11. Vacuum brake booster according to claim 10, wherein the displaceable unit of armature and permanent magnet is guided in a magnetic device housing, which is fixed in the control valve housing and provides the stop.

12. Vacuum brake booster according to claim 10, wherein a first spring preloads the armature and the permanent magnet away from one another, that a second spring preloads the displaceable unit of armature and permanent magnet counter to actuating direction, and that the joint force of both springs defines the second distance.

13. Vacuum brake booster according to claim 12, wherein the first spring is clamped axially between the armature and the fettering component.

14. Vacuum brake booster according to claim 12, wherein the second spring is supported by its one end against the stop and by its other end against the armature and is coaxial with the first spring.

15. Vacuum brake booster according to claim 10, wherein the permanent magnet is accommodated in the fettering component.

16. Vacuum brake booster according to claim 10, wherein the armature comprises a base and an annular magnetic plate, which is connected to said base and faces the permanent magnet.

17. Vacuum brake booster according to claim 1, wherein the first valve seat is rigidly coupled in the actuating direction to the input element via the armature.

18. Vacuum brake booster according to claim 1, wherein the first valve seat is formed on a sleeve-shaped extension rigidly connected to the armature.

19. Vacuum brake booster according to claim 18, wherein rigidly connected to the input element is a locking bar, which extends into a recess of the extension, on which the first valve seat is formed, and that the play of the locking bar in said recess in the direction of displacement of the input element is smaller than the maximum possible actuating stroke of the input element.

20. Vacuum brake booster according to claim 1, wherein the first distance between the armature and the permanent magnet is reduced in dependence upon a counterforce, which acts upon the vacuum brake booster counter to its actuating direction.

21. Vacuum brake booster according to claim 20, wherein the permanent magnet is connected to an adjusting sleeve, upon which the counterforce acts.

22. Vacuum brake booster according to claim 21, wherein formed on the adjusting sleeve is a stop, towards which the permanent magnet is resiliently preloaded counter to actuating direction.

23. Vacuum brake booster according to claim 21, wherein a reaction disk of elastomeric material transmits the counterforce to the adjusting sleeve.

24. Vacuum brake booster according to claim 21, wherein the adjusting sleeve is rigidly connected to the permanent magnet.

25. Vacuum brake booster according to claim 24, wherein the adjusting sleeve comprises a stop, which cooperates with the housing of the control valve and limits the reduction of the first distance.

26. Vacuum brake booster according to claim 25, wherein a reaction sleeve transmits the counterforce to the adjusting sleeve.

27. Vacuum brake booster according to claim 21, wherein the adjusting sleeve is supported counter to actuating direction via a resiliently compliant element against the housing of the control valve.

28. Vacuum brake booster according to claim 1, wherein a lever arrangement acting upon the permanent magnet reduces the first distance between the armature and the permanent magnet upon operation of the control valve, without undershooting the second distance between the armature and the permanent magnet.

29. Vacuum brake booster according to claim 28, wherein the lever arrangement is supported on the one hand against a power output tappet and on the other hand against the permanent magnet, and that the control valve housing forms a fulcrum for the lever arrangement.

30. Vacuum brake booster according to claim 29, wherein the lever arrangement is, at least essentially, an annular element formed by a plurality of radially extending arms, which are U-shaped in cross section and are connected to one another radially at the inside.

31. Vacuum brake booster according to claim 30, wherein the permanent magnet is preloaded resiliently into contact with the lever arrangement.

32. Vacuum brake booster according to claim 28, wherein the permanent magnet upon actuation of the control valve is pressed by the lever arrangement against a stop.

* * * * *

UNITED STATES PATENT AND TRADEMARK OFFICE
CERTIFICATE OF CORRECTION

PATENT NO.   : 6,505,539 B2
DATED        : January 14, 2003
INVENTOR(S)  : Peter Schluter It is certified that error appears in the above-identified patent and that said Letters Patent is hereby corrected as shown below:

Column 21,
Line 45, replace "Claim 17" with the following Claim 17:

17. Vacuum brake booster according to claim 1, wherein the first valve seat is rigidly coupled to the armature such that as the input element is moved in the actuating direction, the first valve seat moves with the input element.

Signed and Sealed this

Twentieth Day of May, 2003

JAMES E. ROGAN
*Director of the United States Patent and Trademark Office*